United States Patent
Matsunaga et al.

(10) Patent No.: US 9,157,382 B2
(45) Date of Patent: Oct. 13, 2015

(54) IDLING STOP CONTROL DEVICE, VEHICLE AND VEHICLE CONTROL METHOD

(75) Inventors: Masaki Matsunaga, Odawara (JP); Junichi Morimura, Suntoh-gun (JP); Yasunari Kido, Hadano (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/353,590

(22) PCT Filed: Dec. 22, 2011

(86) PCT No.: PCT/JP2011/007217
§ 371 (c)(1),
(2), (4) Date: Apr. 23, 2014

(87) PCT Pub. No.: WO2013/093982
PCT Pub. Date: Jun. 27, 2013

(65) Prior Publication Data
US 2014/0297165 A1    Oct. 2, 2014

(51) Int. Cl.
*F02D 29/02* (2006.01)
*F02D 17/02* (2006.01)
*B60W 10/06* (2006.01)
*F02D 17/04* (2006.01)
*F02N 11/08* (2006.01)
*B60W 10/184* (2012.01)
*B60W 30/18* (2012.01)
*B60W 10/18* (2012.01)

(52) U.S. Cl.
CPC ............... *F02D 17/02* (2013.01); *B60W 10/06* (2013.01); *B60W 10/18* (2013.01); *B60W 10/184* (2013.01); *B60W 30/18018* (2013.01); *F02D 17/04* (2013.01); *F02D 29/02* (2013.01); *F02N 11/0822* (2013.01); *B60W 2510/182* (2013.01); *B60W 2520/04* (2013.01); *B60W 2520/105* (2013.01); *B60W 2540/12* (2013.01); *F02N 2200/0801* (2013.01); *F02N 2200/101* (2013.01); *F02N 2200/102* (2013.01); *Y02T 10/48* (2013.01)

(58) Field of Classification Search
CPC ......... F02D 29/00; F02D 29/06; F02D 29/02; F02N 11/003; F02N 11/0803; F02N 11/0814; F02N 11/0822; F02N 11/0825; F02N 11/084
USPC ...................................................... 123/179.4
See application file for complete search history.

(56) References Cited

U.S. PATENT DOCUMENTS 6,253,144 B1 * 6/2001 Yamamura et al. ............. 701/96
6,330,508 B1 * 12/2001 Akabori et al. ................. 701/96

(Continued)

FOREIGN PATENT DOCUMENTS

| JP | A-2000-120464 | 4/2000 |
| JP | A-2004-084634 | 3/2004 |

(Continued)

*Primary Examiner* — Thomas Moulis
(74) *Attorney, Agent, or Firm* — Oliff PLC

(57) ABSTRACT

An idle reduction control device mounted on a vehicle equipped with an engine and a brake including: a detector that detects a parameter having a positive correlation to an amount of brake operation; and an engine controller that controls a start and a stop of the engine. The engine controller stops the engine after a stop of the vehicle, when a change of the parameter caused by a release of the brake is equal to or greater than a predetermined value during a deceleration period before the stop of the vehicle.

7 Claims, 14 Drawing Sheets

(56) References Cited

U.S. PATENT DOCUMENTS

| | | | |
|---|---|---|---|
| 8,909,400 B2* | 12/2014 | Sato et al. | 701/22 |
| 2001/0018903 A1* | 9/2001 | Hirose et al. | 123/179.4 |
| 2003/0022755 A1* | 1/2003 | Mizutani | 477/107 |
| 2004/0231951 A1* | 11/2004 | Hasegawa et al. | 192/220 |
| 2006/0048734 A1* | 3/2006 | Kataoka et al. | 123/179.4 |
| 2010/0076656 A1* | 3/2010 | Hiyoshi et al. | 701/70 |
| 2010/0222991 A1* | 9/2010 | Berr | 701/112 |
| 2011/0136625 A1* | 6/2011 | Yu et al. | 477/185 |
| 2011/0294622 A1* | 12/2011 | Kimura et al. | 477/95 |
| 2012/0080001 A1* | 4/2012 | Saito et al. | 123/179.4 |
| 2012/0190500 A1* | 7/2012 | Yamada et al. | 477/184 |
| 2012/0303194 A1* | 11/2012 | Muta | 701/22 |

FOREIGN PATENT DOCUMENTS

| | | |
|---|---|---|
| JP | A-2008-238988 | 10/2008 |
| JP | A-2011-202645 | 10/2011 |

* cited by examiner

IDLING STOP CONTROL DEVICE, VEHICLE AND VEHICLE CONTROL METHOD

TECHNICAL FIELD

The present invention relates to an idle reduction control device mounted on a vehicle equipped with an engine and a brake, a vehicle equipped with an engine and a brake and a vehicle control method of controlling a vehicle equipped with an engine and a brake.

BACKGROUND ART

In the prior art, idle reduction has been known to stop an engine during a stop of a vehicle, such as an automobile, and restart the engine at the time of starting the vehicle, in order to reduce fuel consumption and gas emission during the stop of the vehicle. It is preferable to perform idle reduction when the automobile stops for a relatively long time, for example, when the automobile stops at a traffic light. Idle reduction in the case of a short stop time, for example, during a traffic jam causes a problem that a stop and a restart of the engine are repeated frequently. In order to solve this problem, a variety of techniques have been known to predict, when an automobile stops, whether the stop time is long or short, based on, for example, application of brake, the accelerator position and the gearshift lever position of the automobile.

For example, Patent Literature 1 discloses a technique that identifies the type of the driver's vehicle stopping operation, such as application of foot brake, application of parking brake or gear shifting, and determines an expected vehicle stop time, which is specified in advance corresponding to the type of the vehicle stopping operation. Patent Literature 2 discloses a technique that performs idle reduction when the vehicle speed decreases to or below an idle reduction-permitting vehicle speed and when the braking amount becomes equal to or greater than a stop decision threshold value.

CITATION LIST

Patent Literatures

PTL 1: JP 2008-238988A
PTL 2: JP 2011-202645A
PTL 3: JP 2000-120464A
PTL 4: JP 2004-084634A

SUMMARY OF INVENTION

Technical Problem

It is, however, not easy to predict whether the vehicle stop time is long or short, based on the type of the driver's vehicle stopping operation, for example, application of foot brake, application of parking brake or gear shifting as described in the above prior art. Similarly, it is also not easy to predict whether the vehicle stop time is longer or shorter, based on comparisons of the vehicle speed and the braking amount with respective threshold values. There is accordingly still a room for improvement with regard to the technology of idle reduction.

In order to solve the above problems, an object of the invention is to arrange the details of idle reduction control in a vehicle having an idle reduction function for the purpose of further improving the fuel consumption of the vehicle.

Solution to Problem

In order to solve at least part of the problems described above, the invention is implemented by the following aspects or embodiments.

Aspect 1

There is provided an idle reduction control device mounted on a vehicle equipped with an engine and a brake, comprising: a detector that detects a parameter having a positive correlation to an amount of brake operation; and an engine controller that controls a start and a stop of the engine, wherein the engine controller stops the engine after a stop of the vehicle, when a change of the parameter caused by a release of the brake is equal to or greater than a predetermined value during a deceleration period before the stop of the vehicle.

When the change in parameter caused by a brake force-reducing operation is equal to or greater than the predetermined value during the deceleration period before the stop of the vehicle, this configuration immediately stops the engine after the stop of the vehicle, thus improving the fuel consumption of the vehicle.

Aspect 2

There is provided the idle reduction control device described in Aspect 1, wherein the engine controller prohibits the engine from being stopped after the stop of the vehicle, when the change of the parameter is less than the predetermined value during the deceleration period.

When the change in parameter during the deceleration period is less than the predetermined value, this configuration makes the engine idle after the stop of the vehicle, thus improving the fuel consumption of the vehicle.

Aspect 3

There is provided the idle reduction control device described in Aspect 2, wherein the engine controller prohibits the engine from being stopped after the stop of the vehicle and eliminates the prohibition after elapse of a predetermined time, when the change of the parameter is less than the predetermined value during the deceleration period.

When the change in parameter during the deceleration period is less than the predetermined value, this configuration makes the engine idle after the stop of the vehicle and stops the engine after elapse of the predetermined time, thus improving the fuel consumption of the vehicle.

Aspect 4

There is provided the idle reduction control device described in any of Aspects 1 to 3, wherein the parameter is a brake hydraulic pressure, and the engine controller stops the engine after the stop of the vehicle, when a reduction of the brake hydraulic pressure caused by the release of the brake is equal to or greater than a predetermined value, during the deceleration period.

When the reduction of the brake hydraulic pressure caused by the brake force-reducing operation is equal to or greater than the predetermined value during the deceleration period, this configuration immediately stops the engine after the stop of the vehicle, thus improving the fuel consumption of the vehicle.

Aspect 5

There is provided the idle reduction control device described in Aspect 4, wherein the engine controller stops the engine after the stop of the vehicle, when a difference between a brake hydraulic pressure detected by the detector and a maximum value of brake hydraulic pressures detected prior to the detected brake hydraulic pressure during the deceleration period is equal to or greater than a predetermined value.

This configuration readily calculates the reduction of the brake hydraulic pressure caused by the brake force-reducing operation by the difference between the brake hydraulic pressure detected by the detector and the maximum value of brake hydraulic pressures detected prior to the detected brake hydraulic pressure during the deceleration period.

Aspect 6

There is provided an idle reduction control device mounted on a vehicle equipped with an engine and a brake, comprising: a detector that detects a parameter having a positive correlation to an amount of brake operation; and an engine controller that controls a start and a stop of the engine, wherein the engine controller stops the engine after a stop of the vehicle, when a maximum value of the parameter caused by the brake operation is equal to or less than a predetermined value, during a deceleration period before the stop of the vehicle.

When the maximum value of the parameter increased by the brake operation is equal to or less than the predetermined value during the deceleration period before the stop of the vehicle, this configuration immediately stops the engine after the stop of the vehicle, thus improving the fuel consumption of the vehicle.

Aspect 7

There is provided the idle reduction control device described in Aspect 6, wherein the engine controller prohibits the engine from being stopped after the stop of the vehicle, when the maximum value of the parameter is greater than the predetermined value during the deceleration period, and the engine controller stops the engine before elapse of the delay time since the stop of the vehicle, when the maximum value of the parameter is equal to or less than the predetermined value.

When the maximum value of the parameter during the deceleration period is greater than the predetermined value, this configuration makes the engine idle after the stop of the vehicle, thus improving the fuel consumption of the vehicle.

Aspect 8

There is provided the idle reduction control device described in Aspect 7, wherein the engine controller prohibits the engine from being stopped after the stop of the vehicle and eliminates the prohibition after elapse of a predetermined time, when the maximum value of the parameter is greater than the predetermined value during the deceleration period.

When the maximum value of the parameter during the deceleration period is greater than the predetermined value, this configuration makes the engine idle after the stop of the vehicle and stops the engine after elapse of the predetermined time, thus improving the fuel consumption of the vehicle.

Aspect 9

There is provided the idle reduction control device according to any of Aspects 6 to 8, wherein the parameter is a brake hydraulic pressure, and the engine controller stops the engine after the stop of the vehicle, when a maximum value of the brake hydraulic pressure caused by the brake operation is equal to or less than a predetermined value, during the deceleration period.

When the maximum value of the brake hydraulic pressure increased by the brake operation is equal to or less than the predetermined value during the deceleration period, this configuration immediately stops the engine after the stop of the vehicle, thus improving the fuel consumption of the vehicle.

Aspect 10

There is provided an idle reduction control device mounted on a vehicle equipped with an engine and a brake, comprising: a detector that detects a parameter having a positive correlation to an amount of brake operation: and an engine controller that controls a start and a stop of the engine, wherein the engine controller stops the engine after a stop of the vehicle, when a maximum value of the parameter caused by the brake operation is equal to or less than a predetermined value in a state where a vehicle speed of the vehicle decreases below a specified value, during a deceleration period before the stop of the vehicle.

When the maximum value of the parameter increased by the brake operation is equal to or less than the predetermined value in the state where the vehicle speed of the vehicle decreases below the specified value, this configuration immediately stops the engine after the stop of the vehicle, thus improving the fuel consumption of the vehicle.

Aspect 11

There is provided the idle reduction control device described in Aspect 10, wherein the engine controller prohibits the engine from being stopped after the stop of the vehicle, when the maximum value of the parameter is greater than the predetermined value in the state where the vehicle speed of the vehicle decreases below the specified value, during the deceleration period.

When the vehicle speed of the vehicle is higher than the specified value during the deceleration period, this configuration makes the engine idle after the stop of the vehicle, thus improving the fuel consumption of the vehicle.

Aspect 12

There is provided the idle reduction control device described in Aspect 11, wherein the engine controller prohibits the engine from being stopped after the stop of the vehicle and eliminate the prohibition after elapse of a predetermined time, when the maximum value of the parameter is greater than the predetermined value in the state where the vehicle speed of the vehicle decreases below the specified value during the deceleration period.

When the vehicle speed of the vehicle is higher than the specified value during the deceleration period, this configuration makes the engine idle after the stop of the vehicle and stops the engine after elapse of the predetermined time, thus improving the fuel consumption of the vehicle.

Aspect 13

There is provided the idle reduction control device described in any of Aspects 10 to 12, wherein the parameter is a brake hydraulic pressure, and the engine controller stops the engine after the stop of the vehicle, when a maximum value of the brake hydraulic pressure caused by the brake operation is equal to or less than a predetermined value in the state where the vehicle speed of the vehicle decreases below the specified value, during the deceleration period.

When the maximum value of the brake hydraulic pressure is equal to or less than the predetermined value in the state where the vehicle speed of the vehicle decreases below the specified value during the deceleration period, this configuration immediately stops the engine after the stop of the vehicle, thus improving the fuel consumption of the vehicle.

Aspect 14

There is provided a vehicle equipped with an engine and a brake, comprising: a detector that detects a parameter having a positive correlation to an amount of brake operation; and an engine controller that controls a start and a stop of the engine, wherein the engine controller stops the engine after a stop of the vehicle, when a change of the parameter caused by a release of the brake is equal to or greater than a predetermined value during a deceleration period before the stop of the vehicle.

When the change in parameter caused by a brake force-reducing operation is equal to or greater than the predetermined value during the deceleration period before the stop of the vehicle, the vehicle of this configuration immediately stops the engine after the vehicle stop, thus improving the fuel consumption.

Aspect 15

There is provided a vehicle control method of controlling a vehicle equipped with an engine and a brake, comprising: (a) detecting a parameter having a positive correlation to an amount of brake operation; and (b) stopping the engine after a stop of the vehicle, when a change of the parameter caused by a release of the brake is equal to or greater than a predetermined value, during a deceleration period before the stop of the vehicle.

When the change in parameter caused by a brake force-reducing operation is equal to or greater than the predetermined value during the deceleration period before the stop of the vehicle, the method of this configuration controls the vehicle to immediately stop the engine after the vehicle stop, thus improving the fuel consumption of the vehicle.

The invention may be implemented by a variety of aspects: for example, a control system and an automobile including the idle reduction control device described above, a manufacturing method and a manufacturing apparatus of the idle reduction control device, a computer program that causes the computer to implement the functions corresponding to the respective steps of the vehicle control method, a storage medium in which such a computer program is stored.

DESCRIPTION OF EMBODIMENTS

A. First Embodiment

Figure 1:
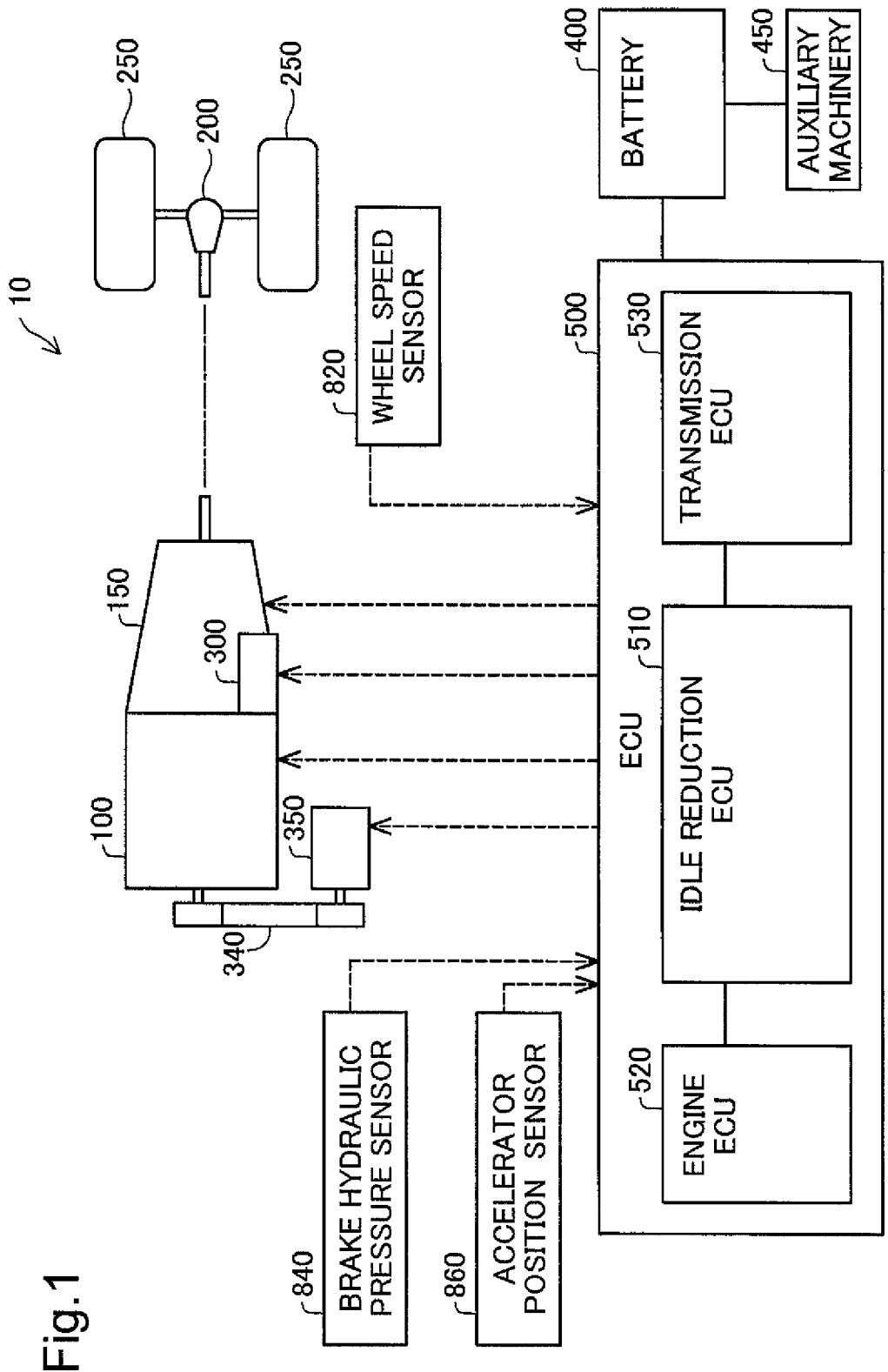
FIG. 1 is a diagram illustrating the general configuration of an automobile according to a first embodiment.

FIG. 1 is a diagram illustrating the general configuration of an automobile according to a first embodiment. The automobile 10 is a vehicle having idle reduction function. The automobile 10 includes an engine 100, an automatic transmission 150, a differential gear 200, drive wheels 250, a starter 300, an alternator 350, a battery 400 and an electronic control unit (ECU) 500.

The engine 100 is an internal combustion engine that generates power by combustion of a fuel such as gasoline or light oil. The power of the engine 100 is transmitted to the automatic transmission 150, while being transmitted to the alternator 350 via a drive mechanism 340. The output of the engine 100 is changed according to the amount of the driver's accelerator pedal operation by the electronic control unit 500.

The automatic transmission 150 automatically changes the gear ratio (so-called gear shifting). The power (rotation speed·torque) of the engine 100 is subjected to gear shifting by the automatic transmission 150 and is transmitted as a desired rotation speed·torque via the differential gear 200 to the left and right drive wheels 250. The power of the engine 100 is accordingly changed according to the amount of accelerator pedal operation and is transmitted via the automatic transmission 150 to the drive wheels 250 to accelerate or decelerate the vehicle (automobile 10).

The starter 300 is a self starter to start the engine 100 with electric power supplied from the battery 400. In general, when the driver operates a non-illustrated ignition switch to start driving an automobile at a stop, the starter 300 is activated to start the engine 100. This starter 300 may be used to restart the engine 100 in the no idling state. The no idling state denotes the state where the engine 100 is stopped by idle reduction control described later.

The alternator 350 uses part of the power of the engine 100 to generate electric power. The generated electric power is used to charge the battery 400 via a non-illustrated inverter. This alternator 350 may be used to restart the engine 100 in the no idling state. The drive mechanism 340 is provided as a mechanical section to transmit the power of the engine 100 to the alternator 350, and a belt drive is employed herein as the drive mechanism 340. The battery 400 is a lead acid battery serving as a DC power source for a voltage of 14 V and supplies electric power to auxiliary machinery 450. The automobile 10 has lamps and lights, windshield wipers and an air conditioner (A/C) as the auxiliary machinery 450.

The electronic control unit 500 is configured to include an idle reduction ECU 510, an engine ECU 520 and a transmission ECU 530. Each of the ECUs 510, 520 and 530 is implemented by a computer including a CPU, a ROM and a RAM. The electronic control unit 500 may optionally include ECUs other than those described above, for example, an auxiliary machinery drive motor ECU to drive the auxiliary machinery 450 during stop of the engine 100. The respective ECUs 510, 520 and 530 receive supplies of electric power from the battery 400. The electronic control unit 500 corresponds to the "idle reduction control device" in the claims.

The idle reduction ECU 510 performs idle reduction control. The idle reduction control is performed to stop or restart the engine upon satisfaction of predetermined conditions. The specific details of the idle reduction control will be described later with reference to FIGS. 2 to 4. The idle reduction ECU 510 is connected with the engine ECU 520 and the transmission ECU 530 via signal lines in such a manner as to allow two-way communication. The idle reduction ECU 510 is also connected via signal lines with a wheel speed sensor 820 that detects rotation speed Vr of the drive wheels 250, a brake hydraulic pressure sensor 840 that detects a brake hydraulic pressure P substantially proportional to an amount of brake pedal operation and an accelerator position sensor 860 that detects an amount of accelerator pedal operation as an accelerator opening. The brake hydraulic pressure sensor 840 corresponds to the "detector" in the claims.

The brake hydraulic pressure sensor 840 of the embodiment detects a hydraulic pressure in a master cylinder (master hydraulic pressure) but may be configured to detect a hydraulic pressure other than the hydraulic pressure in the master cylinder. The embodiment uses the brake hydraulic pressure as a parameter having a positive correlation to the amount of brake pedal operation. The automobile 10 may, however, be configured to detect any arbitrary parameter other than the brake hydraulic pressure, which is correlated to the amount of brake pedal operation. For example, the automobile 10 may have a brake stroke sensor that detects an amount of brake pedal operation or a brake pedal force sensor that detects an amount of brake pedal force, in place of the brake hydraulic pressure sensor 840. The idle reduction ECU 510 is enabled to calculate the vehicle speed V of the automobile 10 from the rotation speed Vr detected by the wheel speed sensor 820 but may be configured to obtain the vehicle speed V of the automobile 10 from a non-illustrated speed sensor.

The idle reduction ECU 510 stores a computer program, which causes the CPU to perform idle reduction control, in the ROM. The idle reduction ECU 510 changes the timing of an engine stop after a vehicle stop according to a change in amount of brake pedal operation during a deceleration period Td (FIG. 2) prior to the vehicle stop in the idle reduction control. More specifically, the idle reduction ECU 510 changes the timing of an engine stop after a vehicle stop according to a change in brake hydraulic pressure P detected by the brake hydraulic pressure sensor 840 during the deceleration period Td.

The engine ECU 520 is connected via signal lines with the wheel speed sensor 820, the accelerator position sensor 860 and a non-illustrated engine rotation speed sensor. The engine ECU 520 adjusts, for example, the amount of fuel injection and the throttle opening based on the information detected by these sensors, so as to control the operating conditions of the engine 100. When the vehicle stops, the engine ECU 520 stops fuel injection to the engine 100 to stop the operation of the engine 100, in response to a request from the idle reduction ECU 510. On a start of the vehicle, the engine ECU 520 controls the starter 300 or the alternator 350 to start the engine 100, in response to a request from the idle reduction ECU 510. The engine ECU 520 corresponds to the "engine controller" in the claims.

The transmission ECU 530 is connected via signal lines with the wheel speed sensor 802, the accelerator position sensor 860 and a non-illustrated shift position sensor. The transmission ECU 530 controls a non-illustrated hydraulic actuator based on the information detected by these sensors, so as to change the gear ratio of the automatic transmission 150.

Figure 2:
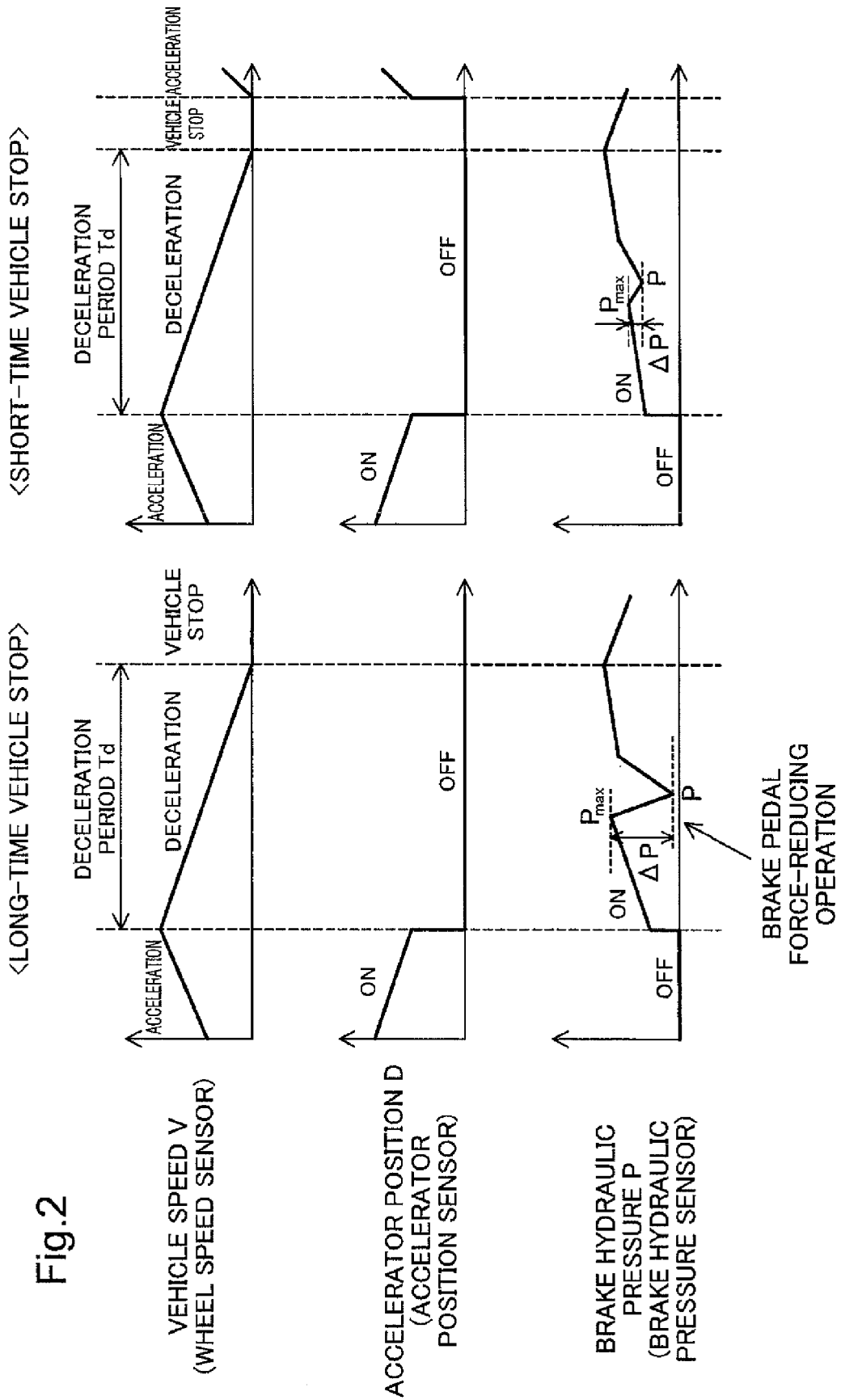
FIG. 2 is a diagram illustrating the details of idle reduction control.

FIG. 2 is a diagram illustrating the details of idle reduction control. The idle reduction ECU 510 predicts whether a vehicle stop time after the deceleration period Td is a long time period (hereinafter referred to as "long-time vehicle stop") or a short time period (hereinafter referred to as "short-time vehicle stop"), based on a brake pedal force-reducing operation during the deceleration period Td before a stop of the automobile 10. The brake pedal force-reducing operation denotes the driver's operation of reducing the brake pedal force during deceleration.

In general, idle reduction control denotes control of stopping the idle engine during deceleration or during stop of the automobile for the purpose of reduction of fuel consumption. When the vehicle stop time is short (for example, about 5 seconds), the amount of fuel consumption needed to restart the engine may become greater than the amount of fuel consumption reduced by stopping the engine, which results in increasing the total amount of fuel consumption. A preferable procedure of idle reduction control accordingly predicts whether a vehicle stop after the deceleration period Td is a long-time vehicle stop (for example, 10 seconds to several minutes) or a short-time vehicle stop (for example, 5 seconds or less) and stops the engine only in the case of a long-time vehicle stop.

The long-time vehicle stop includes various vehicle stops that need adjustment of the vehicle stop position to a specified position, for example, a vehicle stop at a traffic light or a vehicle stop for parking. The specified position herein means a position specified, for example, by a white line on the road or by another automobile in front. During the deceleration period Td prior to a long-time vehicle stop, the driver controls the braking distance to adjust the vehicle stop position to the specified position. This causes an operation of temporarily reducing the brake pedal force, i.e., the brake pedal force-reducing operation.

The short-time vehicle stop, on the other hand, includes stops that do not need adjustment of the vehicle stop position to a specified position, for example, a vehicle stop in a traffic jam or specifically a vehicle stop to adjust the speed of the automobile to the conditions of external environments including another automobile in front. During the deceleration period Td prior to a short-time vehicle stop, there is basically no need of brake pedal force-reducing operation, since the driver applies the brake, for example, for the purpose of speed adjustment. A fluctuation in amount of brake pedal operation during deceleration may cause a brake pedal force-reducing operation. Compared with the driver's intentional brake pedal force-reducing operation, however, this unintentional operation has a smaller reduction in brake pedal force (change in brake pedal force before and after a release of the brake pedal).

In consideration of the foregoing, the idle reduction control of the embodiment uses the brake hydraulic pressure P substantially proportional to the amount of brake pedal operation and predicts whether a vehicle stop is a long-time vehicle stop or a short-time vehicle stop, based on a change (reduction) of the brake hydraulic pressure P by the brake pedal force-reducing operation during the deceleration period Td. Upon prediction of a long-time vehicle stop, the idle reduction control stops the engine substantially simultaneously with the vehicle stop. Upon prediction of a short-time vehicle stop, on the other hand, the idle reduction control does not stop the engine at the time of the vehicle stop. Even on prediction of a short-time vehicle stop, when the vehicle does not start after elapse of a certain time period, it is presumed that the stop of the vehicle is a long-time vehicle stop. The idle reduction control accordingly stops the engine after elapse of a predetermined time since the stop of the vehicle.

In order to calculate the change (reduction) of the brake hydraulic pressure P by the brake pedal force-reducing operation during the deceleration period Td, the idle reduction ECU 510 holds a maximum value of the brake hydraulic pressure P detected by the brake hydraulic pressure sensor 840 as a maximum brake hydraulic pressure Pmax (FIG. 2). The idle reduction ECU 510 also calculates a brake hydraulic pressure difference ΔP (FIG. 2) which is a difference between the brake hydraulic pressure P newly detected by the brake hydraulic pressure sensor 840 and the stored maximum brake hydraulic pressure Pmax. The idle reduction ECU 510 holds a maximum value of the calculated brake hydraulic pressure difference ΔP as a maximum brake hydraulic pressure difference ΔPmax. The idle reduction ECU 510 predicts whether a vehicle stop is a long-time vehicle stop or a short-time vehicle stop, based on whether the maximum brake hydraulic pressure difference ΔPmax during the deceleration period Td is greater than a predetermined value. The flow of idle reduction control according to this embodiment is described below with reference to FIGS. 3 and 4.

Figure 3:
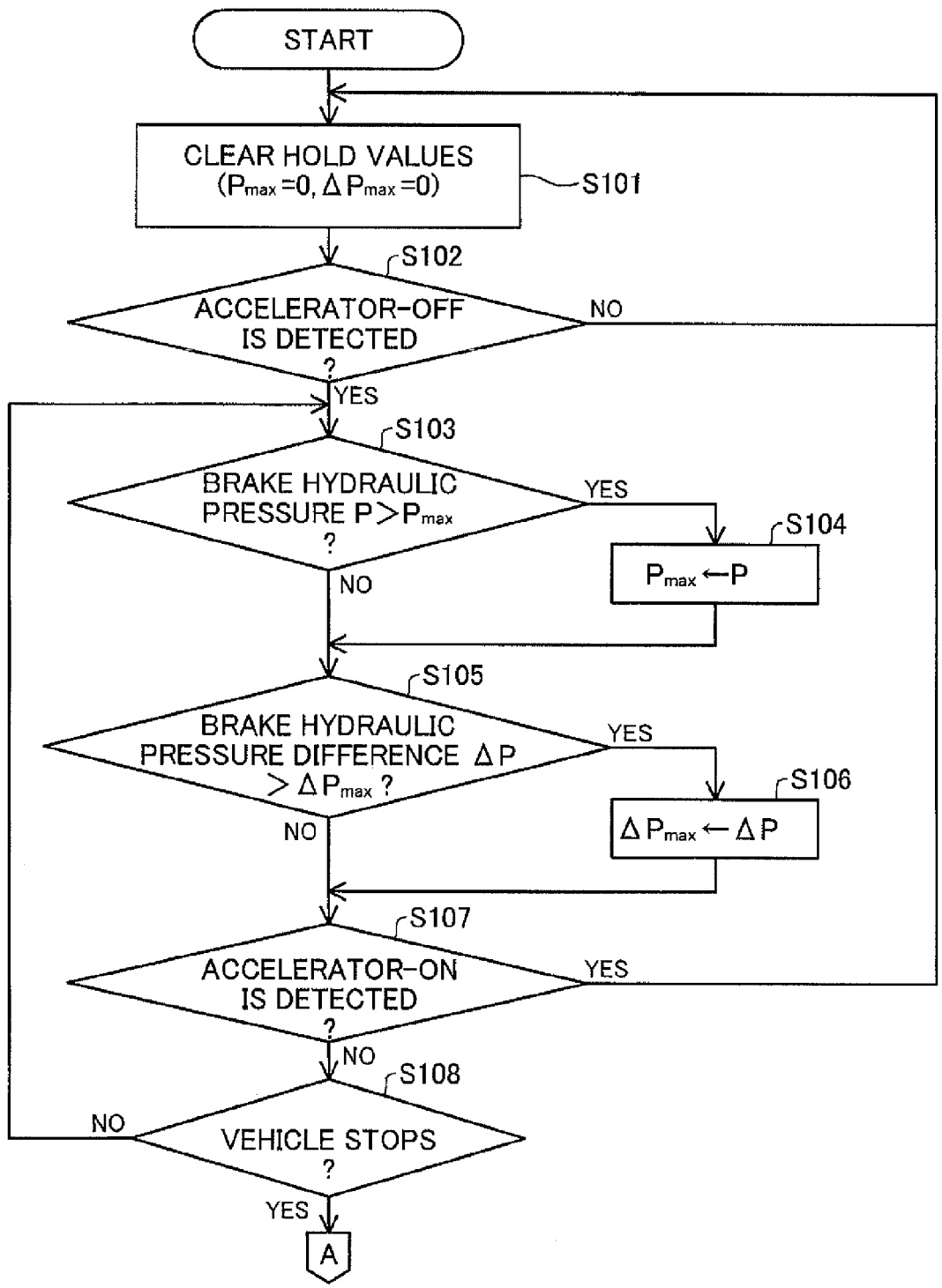
FIG. 3 is a flowchart illustrating a flow of idle reduction control.
Figure 4:
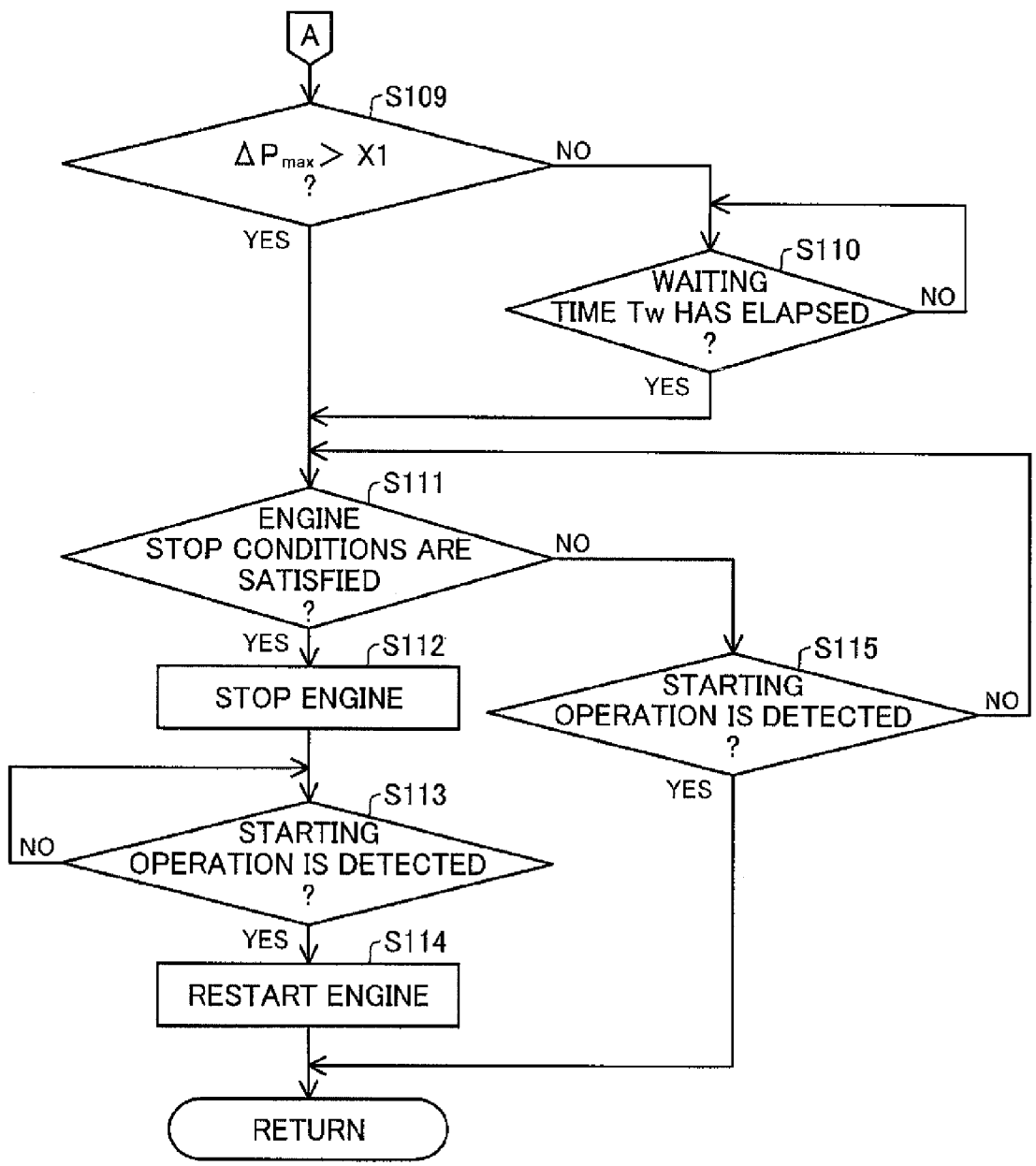
FIG. 4 is a flowchart illustrating the flow of idle reduction control.

FIGS. 3 and 4 are flowcharts illustrating a flow of idle reduction control. The idle reduction ECU 510 performs the routine of FIGS. 3 and 4 repeatedly at predetermined intervals. The following description is on the assumption that the automobile 10 is running. The idle reduction ECU 510 first clears hold values (step S101). More specifically, the idle reduction ECU 510 clears the hold values of the maximum brake hydraulic pressure Pmax and the maximum brake hydraulic pressure difference ΔPmax (Δmax=0, ΔPmax=0). The idle reduction ECU 510 subsequently detects whether the driver releases the accelerator pedal to make the state where the accelerator pedal is released (hereinafter referred to as "accelerator-OFF") (step S102). The idle reduction control ECU 510 detects an accelerator-OFF, based on the accelerator position detected by the accelerator position sensor 860.

Upon no detection of an accelerator-OFF (step S102: NO), i.e., upon detection of the state where the accelerator pedal is stepped on (hereinafter referred to as "accelerator-ON") based on the accelerator position detected by the accelerator position sensor 860, it is contemplated that the automobile 10 is running and does not enter the deceleration period Td (FIG. 2). The idle reduction ECU 510 accordingly repeats steps S101 and S102 until detection of an accelerator-OFF.

Upon detection of an accelerator-OFF (step S102: YES), it is contemplated that the automobile 100 enters the deceleration period Td. The idle reduction ECU 510 accordingly detects a change in brake hydraulic pressure P by the brake pedal force-reducing operation. More specifically, the idle reduction ECU 510 determines whether the brake hydraulic pressure P detected by the brake hydraulic pressure sensor 840 is greater than the hold value of the maximum brake hydraulic pressure Pmax (step S103).

When the detected brake hydraulic pressure P is greater than the hold value of the maximum brake hydraulic pressure Pmax (step S103: YES), the idle reduction ECU 510 updates the maximum brake hydraulic pressure Pmax by the detected brake hydraulic pressure P (step S104). When the detected brake hydraulic pressure P is equal to or less than the hold value of the maximum brake hydraulic pressure Pmax (step S103: NO), on the other hand, the idle reduction ECU 510 skips the process of step S104. The idle reduction ECU 510 subsequently calculates the brake hydraulic pressure difference ΔP and determines whether the calculated brake hydraulic pressure difference ΔP is greater than the hold value of the maximum brake hydraulic pressure difference ΔPmax (step S105). The brake hydraulic pressure difference ΔP is a value obtained by subtracting the brake hydraulic pressure P detected at step S103 from the maximum brake hydraulic pressure Pmax (ΔP=Pmax·P). This brake hydraulic pressure difference ΔP denotes a change of the brake hydraulic pressure P by the brake pedal force-reducing operation during the deceleration period Td.

When the calculated brake hydraulic pressure difference ΔP is greater than the hold value of the maximum brake hydraulic pressure difference ΔPmax (step S105: YES), the idle reduction ECU 510 updates the maximum brake hydraulic pressure difference ΔPmax by the calculated brake hydraulic pressure difference ΔP (step S106). When the calculated brake hydraulic pressure difference ΔP is equal to or less than the hold value of the maximum brake hydraulic pressure difference ΔPmax (step S105: NO), on the other hand, the idle reduction ECU 510 skips the process of step S106. The idle reduction ECU 510 subsequently detects an accelerator-ON, based on the accelerator position detected by the accelerator position sensor 860 (step S107).

Upon detection of an accelerator-ON (step S107: YES), it is contemplated that the automobile 10 temporarily enters the deceleration period Td but the deceleration is not for the purpose of stopping the vehicle. The idle reduction ECU 510 accordingly clears the hold values (Pmax=0, ΔPmax=0) (step S101) and subsequently detects an accelerator-OFF again (step S102). Upon no detection of an accelerator-ON (step S107: NO), on the other hand, it is contemplated that the automobile 10 continues the deceleration period Td since the accelerator is kept OFF. The idle reduction ECU 510 accordingly determines whether or not the automobile 10 stops (step S108). The idle reduction ECU 510 uses the rotation speed Vr of the drive wheels 250 detected by the wheel speed sensor 820 to determine whether or not the automobile 10 stops.

When the automobile 10 does not stop (step S108: NO), it is contemplated that the automobile 10 is still during deceleration and there is a possibility that the driver performs a brake pedal force-reducing operation again. The process flow accordingly returns to step S103 and detects the maximum brake hydraulic pressure ΔPmax by the brake pedal force-reducing operation (steps S103 to S106). When the automobile 10 stops (step S108: YES), on the other hand, it is contemplated that the deceleration period Td is terminated. The idle reduction ECU 510 then determines whether the maximum brake hydraulic pressure difference ΔPmax by the brake pedal force-reducing operation during the deceleration period Td is greater than a threshold value X1 (step S109 in FIG. 4). The threshold value X1 (for example, X1=0.5 MPa) is set arbitrarily and stored in advance in the ROM of the idle reduction ECU 510.

When the maximum brake hydraulic pressure ΔPmax is equal to or less than the threshold value X1 (step S109: NO), the stop of the automobile 10 is predicted as a short-time vehicle stop. The idle reduction ECU 510 accordingly prohibits the engine 100 from being stopped until elapse of a waiting time Tw (for example, Tw=1 to 9 seconds) (step S110: NO). After elapse of the waiting time Tw (step S110: YES), the idle reduction ECU 510 determines whether engine stop conditions for allowing the engine 100 to stop are satisfied (step S111). As a result of determination, when the automobile 10 satisfies the engine stop conditions (step S111: YES), the idle reduction ECU 510 stops the engine 100 (step S112). As described above, the idle reduction ECU 510 delays a stop of the engine 100 after a stop of the vehicle, when the stop of the automobile 10 is predicted as a short-time vehicle stop. More specifically, the idle reduction ECU 510 keeps the engine 100 idle until elapse of a waiting time Tw after a stop of the automobile 10 and subsequently stops the engine 100. The waiting time Tw is set arbitrarily. The waiting time Tw corresponds to the "predetermined time" in the claims.

The engine stop conditions at step S111 are conditions to allow the engine 100 to stop and are set arbitrarily. The engine stop conditions may be, for example, that the gearshift position is in a specified range, the battery 400 has a sufficient capacity, and the brake is ON. In order to stop the engine 100, at step S112, the idle reduction ECU 510 requests the engine ECU 520 to stop the engine 100. When receiving the request, the engine ECU 520 cuts off the supply of fuel to the engine 100 to stop the engine 100.

The description goes back to step S109. When the maximum brake hydraulic pressure difference ΔPmax is greater than the threshold value X1 (step S109: YES), the stop of the automobile 10 is predicted as a long-time vehicle stop. The idle reduction ECU 510 accordingly determines whether the engine stop conditions are satisfied (step S111) without any delay time. As a result of determination, when the automobile 10 satisfies the engine stop conditions (step S111: YES), the idle reduction ECU 510 stops the engine 100 (step S112). As described above, the idle reduction ECU 510 stops the engine 100 substantially simultaneously with the stop of the automobile 10, when the stop of the automobile 10 is predicted as a long-time vehicle stop.

After the engine 100 stops, the idle reduction ECU 510 keeps the engine 100 stopped until detection of the driver's starting operation (step S113: NO). The starting operation denotes an operation performed by the driver to start the automobile 10, for example, a brake-OFF, an accelerator-ON and a change in gearshift position. When detecting a starting operation (step S113: YES), the idle reduction ECU 510 restarts the engine 100 (step S114). More specifically, the idle reduction ECU 510 requests the engine ECU 520 to restart the engine 100. When receiving the request, the engine ECU 520 drives the starter 300 or the alternator 350 to restart the engine 100. The process flow then returns to step S101.

When the engine stop conditions are not satisfied at step S111 (step S111: NO), the idle reduction ECU 510 determines whether the engine stop conditions are satisfied (step S111) until detection of the driver's starting operation (step S115: NO). When the driver's starting operation is detected (step S115: YES) during this process, the process flow returns to step S101. This is the flow of idle reduction control.

The electronic control unit 500 of the embodiment described above stops the engine 100 after elapse of the waiting time Tw since a stop of the automobile 10, when a change of the brake hydraulic pressure P (maximum brake hydraulic pressure difference ΔPmax) during the deceleration period Td prior to the stop of the automobile 10 is less than the predetermined value (threshold value X1). This improves fuel consumption of the automobile 10. As described above, it is contemplated that the change (reduction) of the brake hydraulic pressure P during the deceleration period Td has a positive correlation to the subsequent vehicle stop time. When the stop of the vehicle is predicted as a long-time vehicle stop based on the maximum brake hydraulic pressure difference ΔPmax, the electronic control unit 500 immediately stops the engine after a stop of the vehicle, thus reducing fuel consumption during the stop of the vehicle. When the stop of the vehicle is predicted as a short-time vehicle stop, on the other hand, the electronic control unit 500 does not stop the engine but keeps the engine idle, thus eliminating fuel consumption needed for a restart and reducing an increase in fuel consumption. In rare cases, even when the maximum brake hydraulic pressure difference ΔPmax during the deceleration period Td is less than the predetermined value, the actual vehicle stop may become a long-time vehicle stop. The idle reduction control of the embodiment stops the engine 100 after elapse of the waiting time Tw since a stop of the vehicle, when the stop of the vehicle is predicted as a vehicle short-time stop. In the case of a short-time vehicle stop when the actual vehicle stop time is less than the waiting time Tw, the idle reduction control causes the engine to be kept idle. In the case of a long-time vehicle stop when the actual vehicle stop time exceeds the waiting time Tw, on the other hand, the idle reduction control causes the engine to be stopped after the waiting time. Even when the actual vehicle stop is a long-time vehicle stop, such control reduces unnecessary idling and improves fuel consumption.

The technology of identifying the need for idle reduction at the time of a stop of the automobile has been known in the prior art. For example, a known technique detects the own vehicle position using a sensor or GPS and identifies whether the own vehicle position is a location that needs idle reduction during a vehicle stop (for example, JP 2007-100625A and JP 2009-097944A). For detection of the own vehicle position, however, there is a need to install the sensor or the GPS in the automobile, separately from the ECU performing the general idle reduction control. This disadvantageously increases the cost. The configuration of the embodiment is, however, implemented by the ECU performing the general idle reduction control by simply changing the details of the idle reduction control. The configuration of the embodiment is thus implemented at a low cost.

B. Second Embodiment

A second embodiment describes a configuration of predicting whether a vehicle stop is a long-time vehicle stop or a short time vehicle stop, based on the intensity of brake pedal operation during the deceleration period Td in the idle reduction control. The general configuration of the automobile 10 is identical with that of the first embodiment and is thus not specifically described here.

Figure 5:
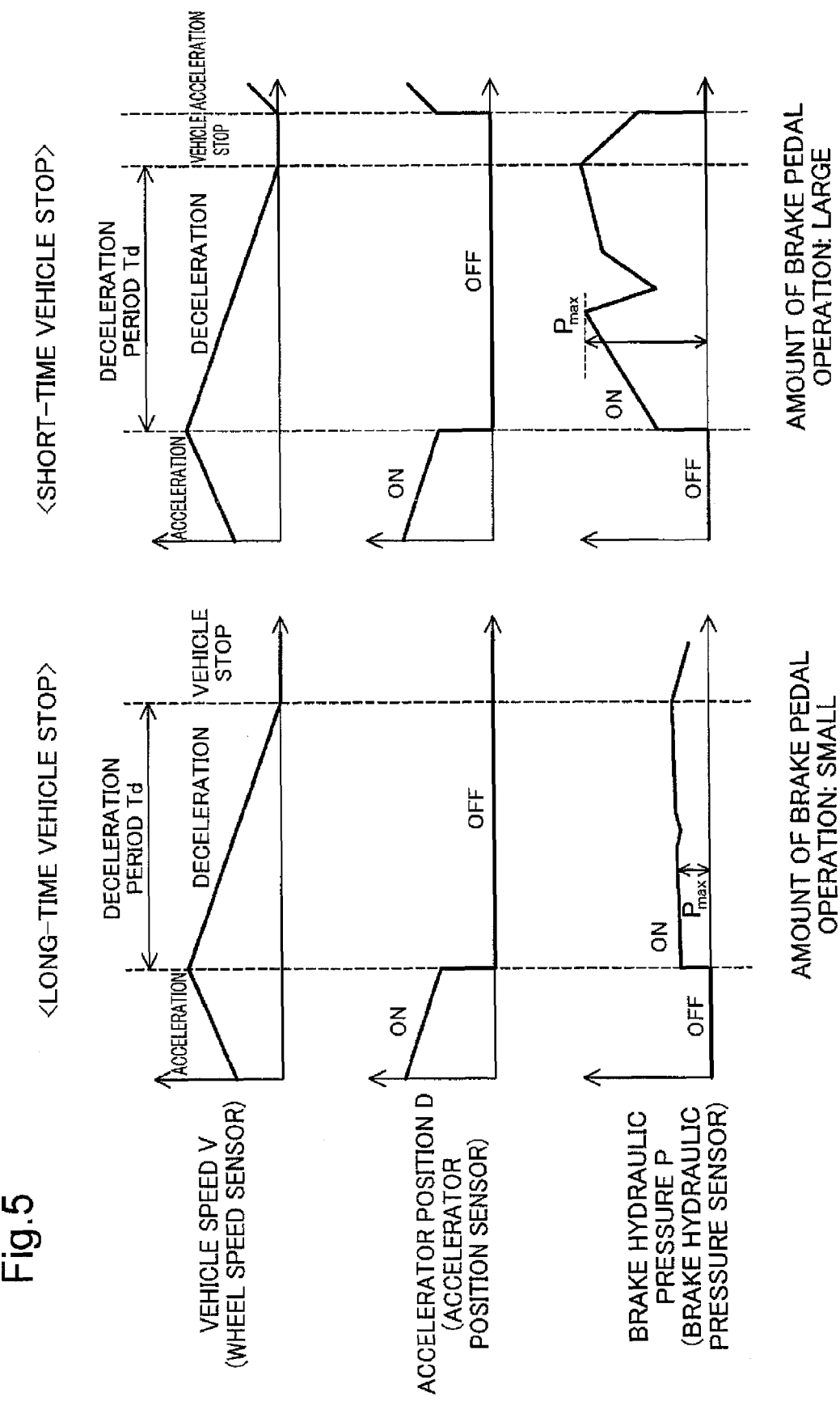
FIG. 5 is a diagram illustrating the details of idle reduction control according to a second embodiment.

FIG. 5 is a diagram illustrating the details of idle reduction control according to the second embodiment. The idle reduction ECU 510 predicts whether a vehicle stop is a long-time vehicle stop or a short-time vehicle stop, based on the magnitude of the maximum brake hydraulic pressure Pmax during the deceleration period Td. As described above, the long-time vehicle stop includes various vehicle stops that need adjustment of the vehicle stop position to a specified position, for example, a vehicle stop at a traffic light or a vehicle stop for parking During the deceleration period Td prior to a long-time vehicle stop, the driver gradually decelerates the vehicle while adjusting the vehicle stop position to the specified position. The driver thus basically does not perform an intense brake pedal operation.

The short-time vehicle stop, on the other hand, includes stops that do not need adjustment of the vehicle stop position to a specified position, for example, a vehicle stop in a traffic jam or specifically a vehicle stop to adjust the speed of the automobile to the conditions of external environments including another automobile in front. During the deceleration period Td prior to a short-time vehicle stop, the driver often performs a relatively intense brake pedal operation, for example, for the purpose of speed adjustment. In consideration of the foregoing, the idle reduction control of the second embodiment predicts whether a vehicle stop is a long-time vehicle stop or a short-time vehicle stop, based on whether the maximum brake hydraulic pressure Pmax during the deceleration period Td is greater than a predetermined value. The process flow after the prediction is the same as that in the idle reduction control of the first embodiment. The idle reduction ECU 510 holds a maximum value of the brake hydraulic pressure P detected by the brake hydraulic pressure sensor 840 as a maximum brake hydraulic pressure Pmax (FIG. 5). The flow of idle reduction control according to this embodiment is described below with reference to FIGS. 6 and 7.

Figure 6:
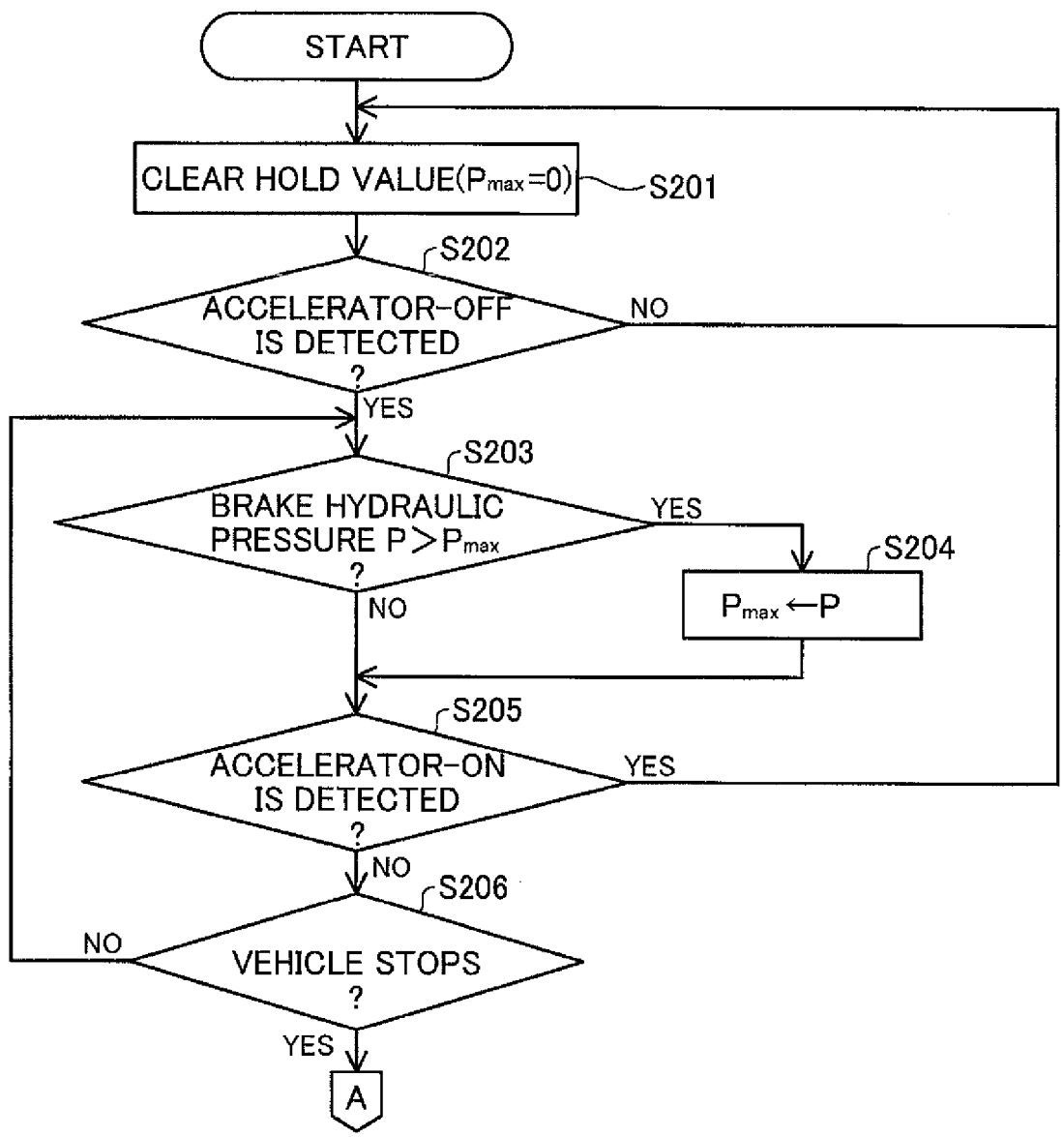
FIG. 6 is a flowchart illustrating a flow of idle reduction control according to the second embodiment.
Figure 7:
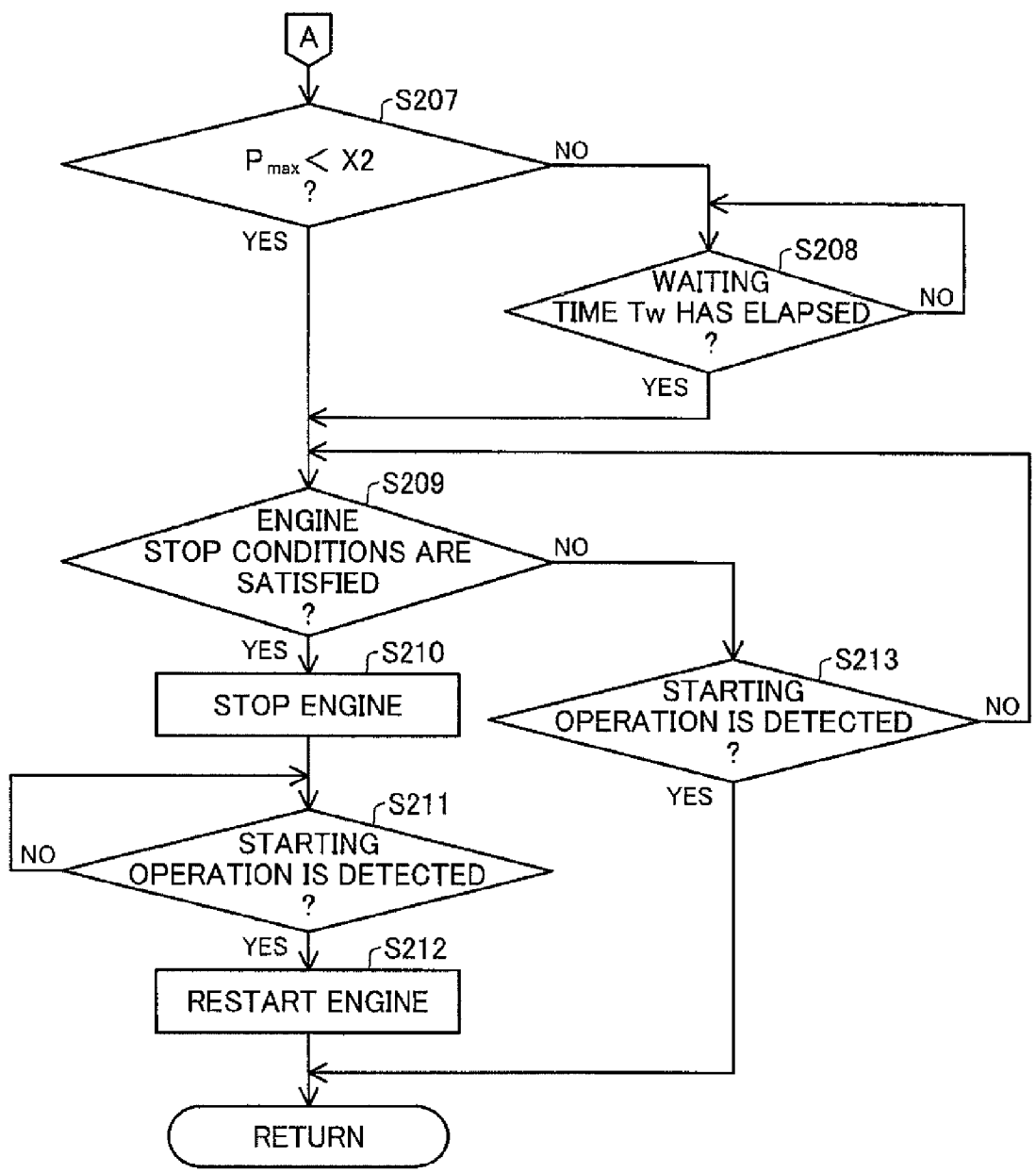
FIG. 7 is a flowchart illustrating the flow of idle reduction control according to the second embodiment.

FIGS. 6 and 7 are flowcharts illustrating a flow of idle reduction control according to the second embodiment. The following describes differences from the idle reduction control explained in the first embodiment. At step S201, the idle reduction ECU 510 clears the hold value of the maximum brake hydraulic pressure Pmax (Pmax=0) (step S201). Unlike the first embodiment, the idle reduction ECU 510 does not need to hold the maximum brake hydraulic pressure difference ΔPmax. The processing of steps S202 to S206 is identical with the processing of steps S102 to S104, S107 and S108 of the first embodiment. The idle reduction control of the second embodiment does not need to perform the processing of step S105 and S106 of the first embodiment.

At step S207, the idle reduction ECU 510 determines whether the maximum brake hydraulic pressure Pmax by the brake pedal operation during the deceleration period Td is less than a threshold value X2 (step S207 in FIG. 7). The threshold value X2 (for example, X2=1.0 [MPa]) is set arbitrarily and is stored in advance in the ROM of the idle reduction ECU 510.

When the maximum brake hydraulic pressure Pmax is equal to or greater than the threshold value X2 (step S207: NO), a stop of the automobile 10 is predicted as a short-time vehicle stop. The idle reduction ECU 510 accordingly delays a stop of the engine 100 after the vehicle stop by the waiting time Tw (steps S208 to S210). When the maximum brake hydraulic pressure Pmax is less than the threshold value X2 (step S207: YES), on the other hand, a stop of the automobile 10 is predicted as a long-time vehicle stop. The idle reduction ECU 510 accordingly stops the engine 100 substantially simultaneously with the stop of the automobile 10 without any delay time (steps S209 and S210). The processing after the stop of the engine 100 (steps S211 and S212) and the processing when the engine stop conditions are not satisfied (step S213) are identical with the processing of steps S102 to S104, S107 and S108 of the first embodiment. This is the flow of idle reduction control according to the second embodiment.

C. Third Embodiment

A third embodiment describes a configuration of predicting whether a vehicle stop is a long-time vehicle stop or a short time vehicle stop, based on the intensity of brake pedal operation immediately before a stop of the automobile 10 in the idle reduction control. The general configuration of the automobile 10 is identical with that of the first embodiment and is thus not specifically described here.

Figure 8:
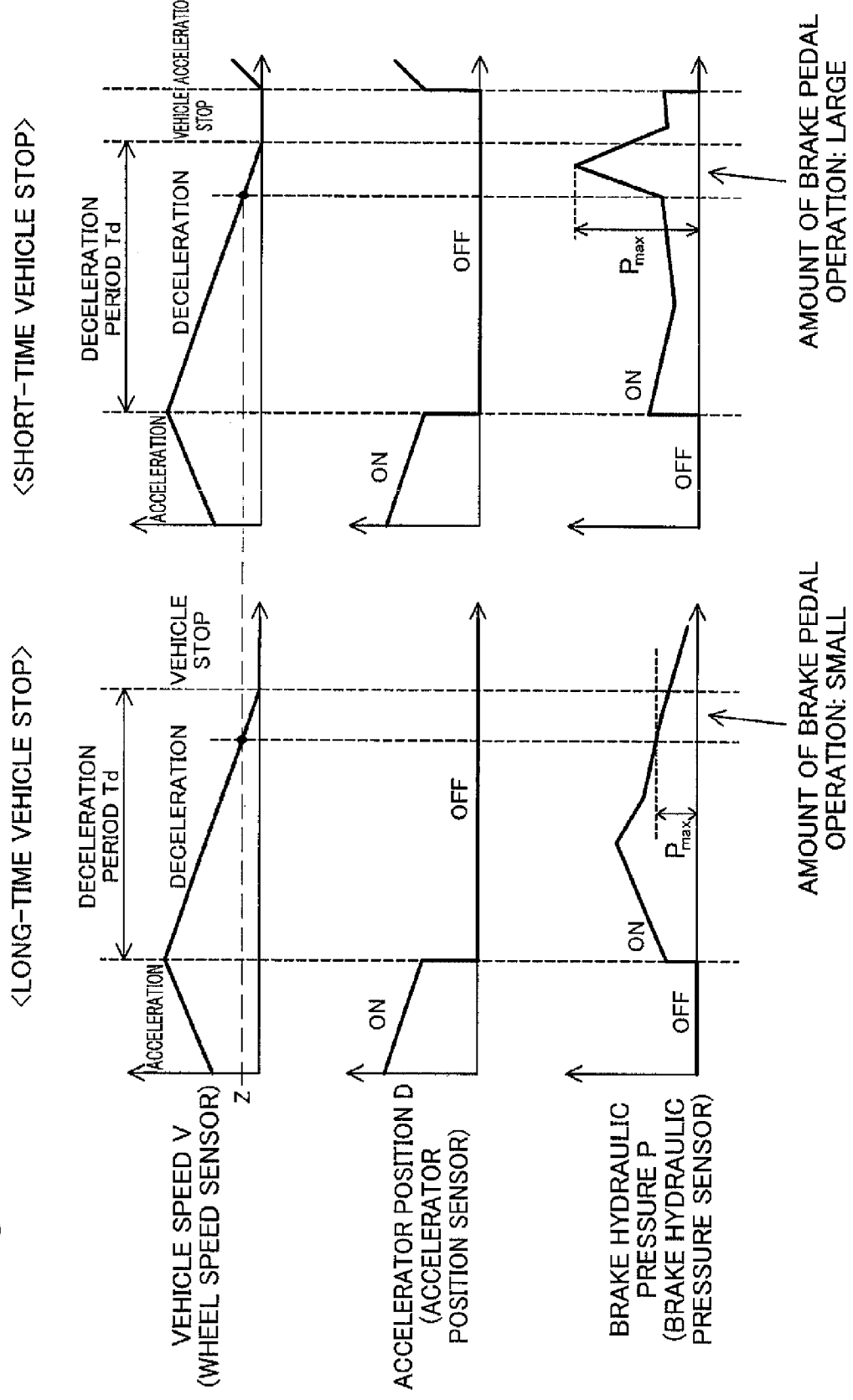
FIG. 8 is a diagram illustrating the details of idle reduction control according to a third embodiment.

FIG. 8 is a diagram illustrating the details of idle reduction control according to the third embodiment. The idle reduction ECU 510 predicts whether a vehicle stop is a long-time vehicle stop or a short-time vehicle stop, based on the magnitude of the maximum brake hydraulic pressure Pmax immediately before a stop of the automobile 10. As described above, the long-time vehicle stop includes various vehicle stops that need adjustment of the vehicle stop position to a specified position. During the deceleration period Td prior to a long-time vehicle stop, the driver gradually decelerates the vehicle while adjusting the vehicle stop position to the specified position. The driver thus basically does not perform an intense brake pedal operation immediately before such a vehicle stop.

The short-time vehicle stop, on the other hand, includes a vehicle stop to adjust the speed of the automobile to the conditions of external environments including another automobile in front, far example, a vehicle stop in a traffic jam. During the deceleration period Td prior to a short-time vehicle stop, the driver often performs a relatively intense brake pedal operation immediately before the vehicle stop. In consideration of the foregoing, the idle reduction control of the third embodiment predicts whether a vehicle stop is a long-time vehicle stop or a short-time vehicle stop, based on whether the maximum brake hydraulic pressure Pmax is greater than a predetermined value when the vehicle speed V decreases to a low speed of or below a specified speed Z (FIG. 8) during the deceleration period Td. The process flow after the prediction is the same as that in the idle reduction control of the first embodiment. The idle reduction ECU 510 holds a maximum value of the brake hydraulic pressure P detected by the brake hydraulic pressure sensor 840 as a maximum brake hydraulic pressure Pmax (FIG. 8). The flow of idle reduction control according to this embodiment is described below with reference to FIGS. 9 and 10.

Figure 9:
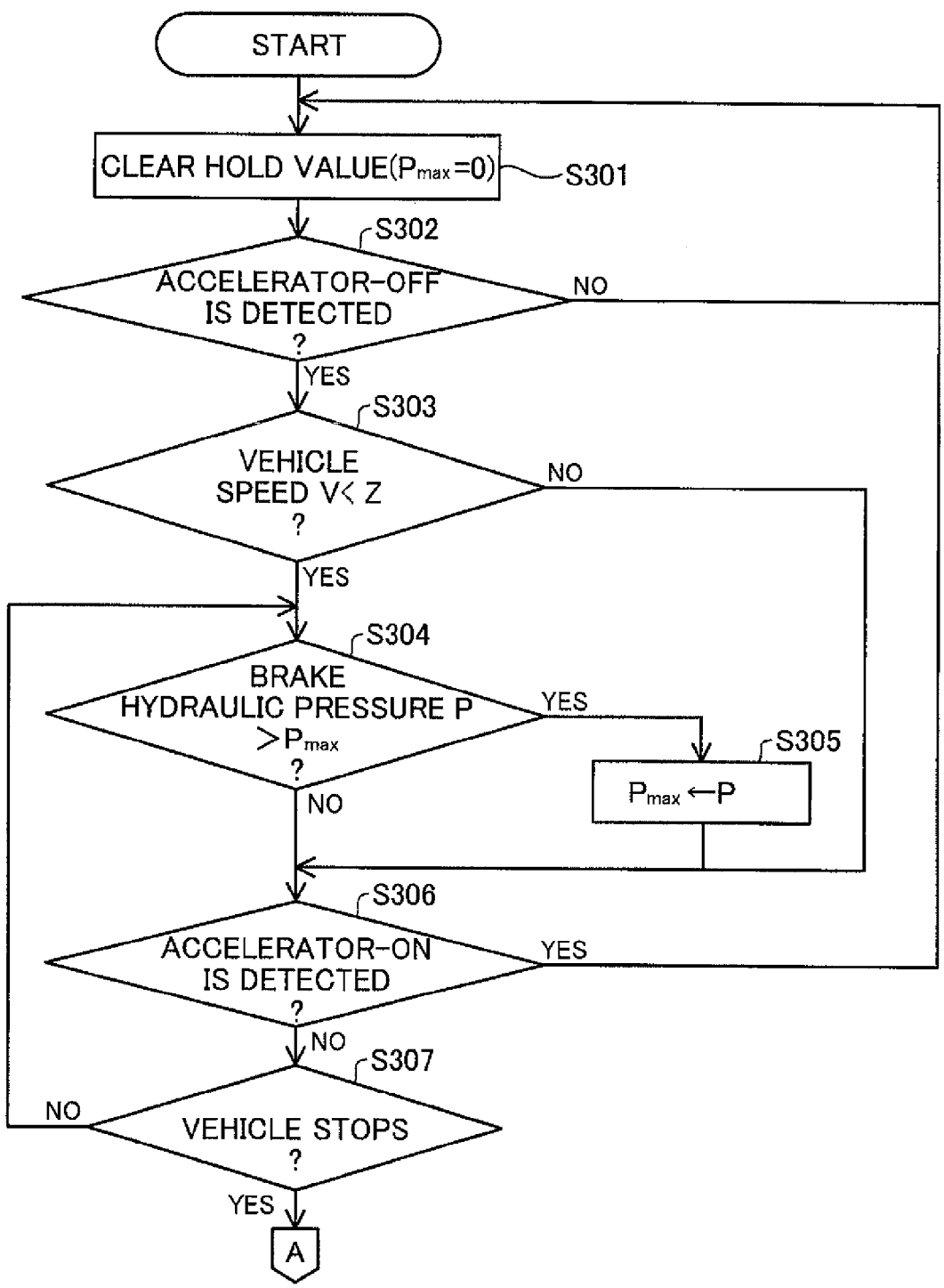
FIG. 9 is a flowchart illustrating a flow of idle reduction control according to the third embodiment.
Figure 10:
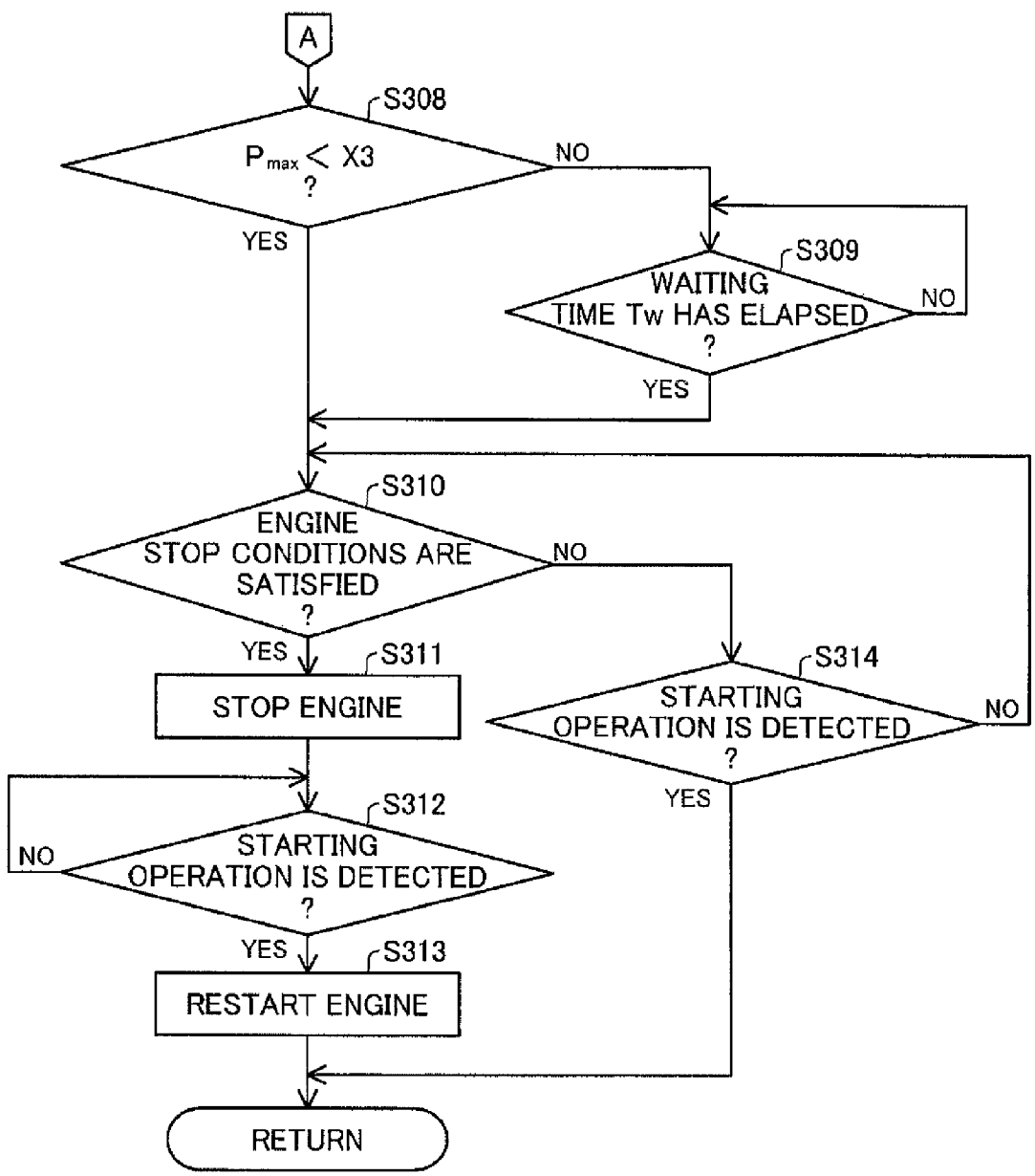
FIG. 10 is a flowchart illustrating the flow of idle reduction control according to the third embodiment.

FIGS. 9 and 10 are flowcharts illustrating a flow of idle reduction control according to the third embodiment. The following describes differences from the idle reduction control explained in the first embodiment. At step S301, the idle reduction ECU 510 clears the hold value of the maximum brake hydraulic pressure Pmax (Pmax=0) (step S301). Unlike the first embodiment, the idle reduction ECU 510 does not need to hold the maximum brake hydraulic pressure difference ΔPmax. The processing of step S302 is identical with the processing of step S102 of the first embodiment. At step S303, the idle reduction ECU 510 determines whether the vehicle speed V of the automobile 10 decreases below a threshold value Z (step S303). In other words, it is determined whether the automobile 10 is in the state immediately before a vehicle stop. The threshold value Z (for example, Z=10 km/h) is set arbitrarily and is stored in advance in the ROM of the idle reduction ECU 510. The vehicle speed V may be calculated from the rotation speed Vr detected by the wheel speed sensor 820 or may be detected by a non-illustrated speed sensor.

When the vehicle speed V is lower than the threshold value Z (step S303: YES), it is expected that the automobile 10 is in the state immediately before a vehicle stop. The idle reduction ECU 510 then determines whether the brake hydraulic pressure P detected by the brake hydraulic pressure sensor 840 is greater than the hold value of the maximum brake hydraulic pressure Pmax (step S304). When the detected brake hydraulic pressure P is greater than the maximum brake hydraulic pressure Pmax (step S304: YES), the idle reduction ECU 510 updates the maximum brake hydraulic pressure Pmax (step S305). When the detected brake hydraulic pressure P is equal to or less than the maximum brake hydraulic pressure Pmax (step S304: NO), on the other hand, the idle reduction ECU 510 skips the processing of step S305.

At step S303, when the vehicle speed V is equal to or higher than the threshold value Z (step S303: NO), on the other hand, it is expected that the automobile 10 is not in the state immediately before a vehicle stop. The idle reduction ECU 510 accordingly skips the processing of step S304. The processing of steps S306 and S307 is identical with the processing of steps S107 and S108 of the first embodiment. At step S308, the idle reduction ECU 510 determines whether the hold value of the maximum brake hydraulic pressure Pmax is less than a threshold value X3 (step S308 in FIG. 10). The threshold value X3 (for example, X3=1.0 MPa) is set arbitrarily and is stored in advance in the ROM of the idle reduction ECU 510.

When the maximum brake hydraulic pressure Pmax is equal to or greater than the threshold value X3 (step S308: NO), a stop of the automobile 10 is predicted as a short-time vehicle stop. The idle reduction ECU 510 accordingly delays a stop of the engine 100 after the vehicle stop by the waiting time Tw (steps S309 to S311). When the maximum brake hydraulic pressure Pmax is less than the threshold value X3 (step S308: YES), on the other hand, a stop of the automobile 10 is predicted as a long-time vehicle stop. The idle reduction ECU 510 accordingly stops the engine 100 substantially simultaneously with the stop of the automobile 10 without any delay time (steps S310 and 311). The processing of steps S312 to S314 is identical with the processing of steps S113 to S115 of the first embodiment. This is the flow of idle reduction control according to the third embodiment.

D. Fourth Embodiment

Figure 11:
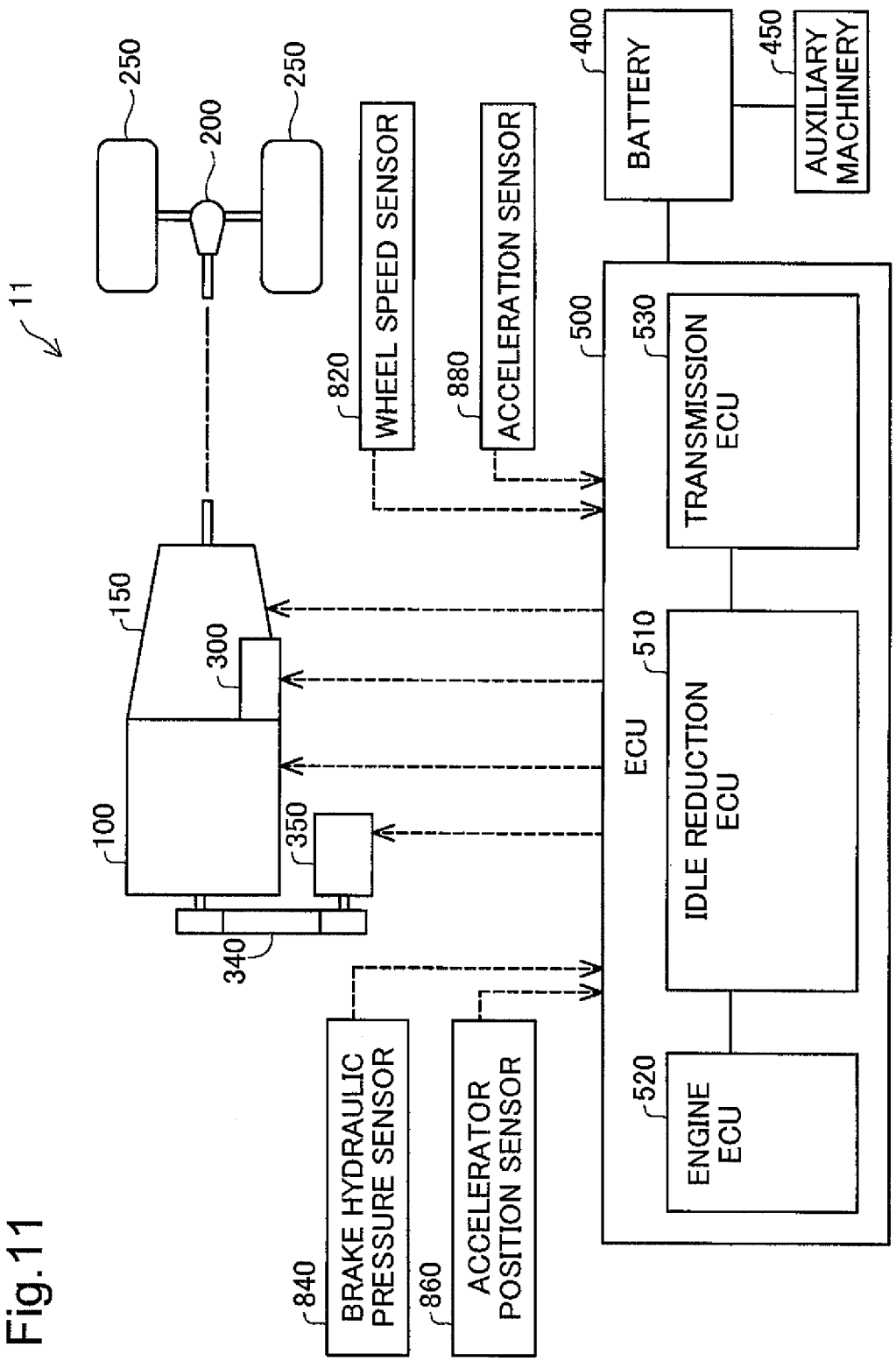
FIG. 11 is a diagram illustrating the general configuration of an automobile according to a fourth embodiment.

FIG. 11 is a diagram illustrating the general configuration of an automobile according to a fourth embodiment. The fourth embodiment describes a configuration of predicting whether a vehicle stop is a long-time vehicle stop or a short-time vehicle stop, based on the intensity of brake pedal operation immediately before a stop of the automobile 10 in the idle reduction control. The automobile 11 of the fourth embodiment differs from the automobile 10 of the first embodiment (FIG. 1) by additionally providing an acceleration sensor 880 to detect an acceleration G in the longitudinal direction of the automobile 11. The idle reduction ECU 510 is connected with the acceleration sensor 880 via a signal line.

Figure 12:
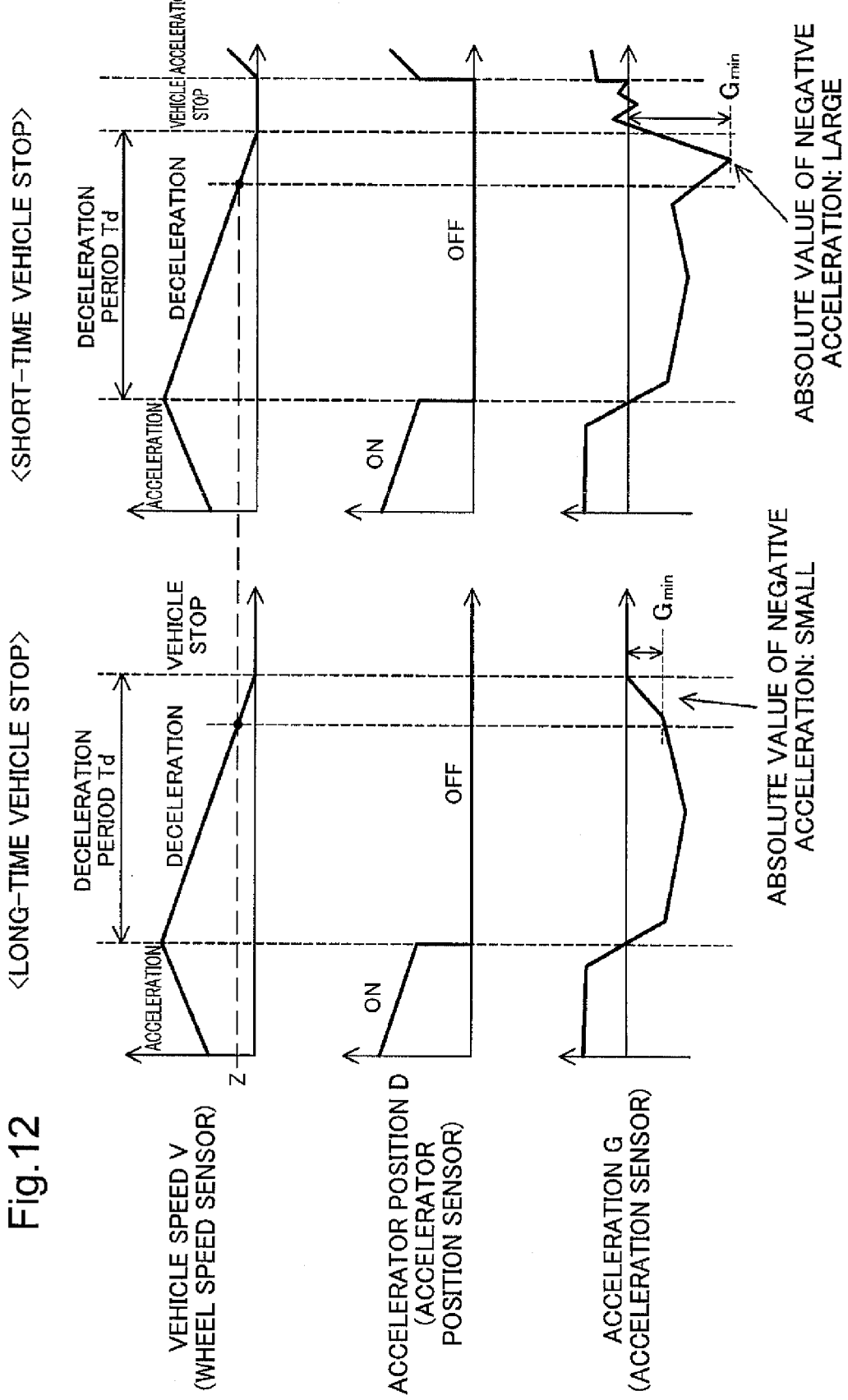
FIG. 12 is a diagram illustrating the details of idle reduction control according to the fourth embodiment.

FIG. 12 is a diagram illustrating the details of idle reduction control according to the fourth embodiment. The idle reduction ECU 510 predicts whether a vehicle stop is a long-time vehicle stop or a short-time vehicle stop, based on the magnitude of the acceleration G detected by the acceleration sensor 880 immediately before a stop of the automobile 10. As described above, the long-time vehicle stop includes various vehicle stops that need adjustment of the vehicle stop position to a specified position. During the deceleration period Td prior to a long-time vehicle stop, the driver gradually decelerates the vehicle while adjusting the vehicle stop position to the specified position. This basically does not increase the absolute value of the negative acceleration (<0).

The short-time vehicle stop, on the other hand, includes a vehicle stop to adjust the speed of the automobile to the conditions of external environments including another automobile in front, for example, a vehicle stop in a traffic jam. During the deceleration period Td prior to a short-time vehicle stop, the driver often performs an intense brake pedal operation, for example, for the purpose of speed adjustment. This leads to a relative increase in absolute value of the negative acceleration. In consideration of the foregoing, the idle reduction control of the fourth embodiment predicts whether a vehicle stop is a long-time vehicle stop or a short-time vehicle stop, based on whether the absolute value of the acceleration G (<0) is greater than a predetermined value when the vehicle speed V decreases to a low speed of or below a specified speed Z (FIG. 12) during the deceleration period Td. The process flow after the prediction is the same as that in the idle reduction control of the first embodiment. The idle reduction ECU 510 holds a minimum value (<0) of the acceleration G detected by the acceleration sensor 880 as a minimum acceleration Gmin (FIG. 12). The flow of idle reduction control according to this embodiment is described below with reference to FIGS. 13 and 14.

Figure 13:
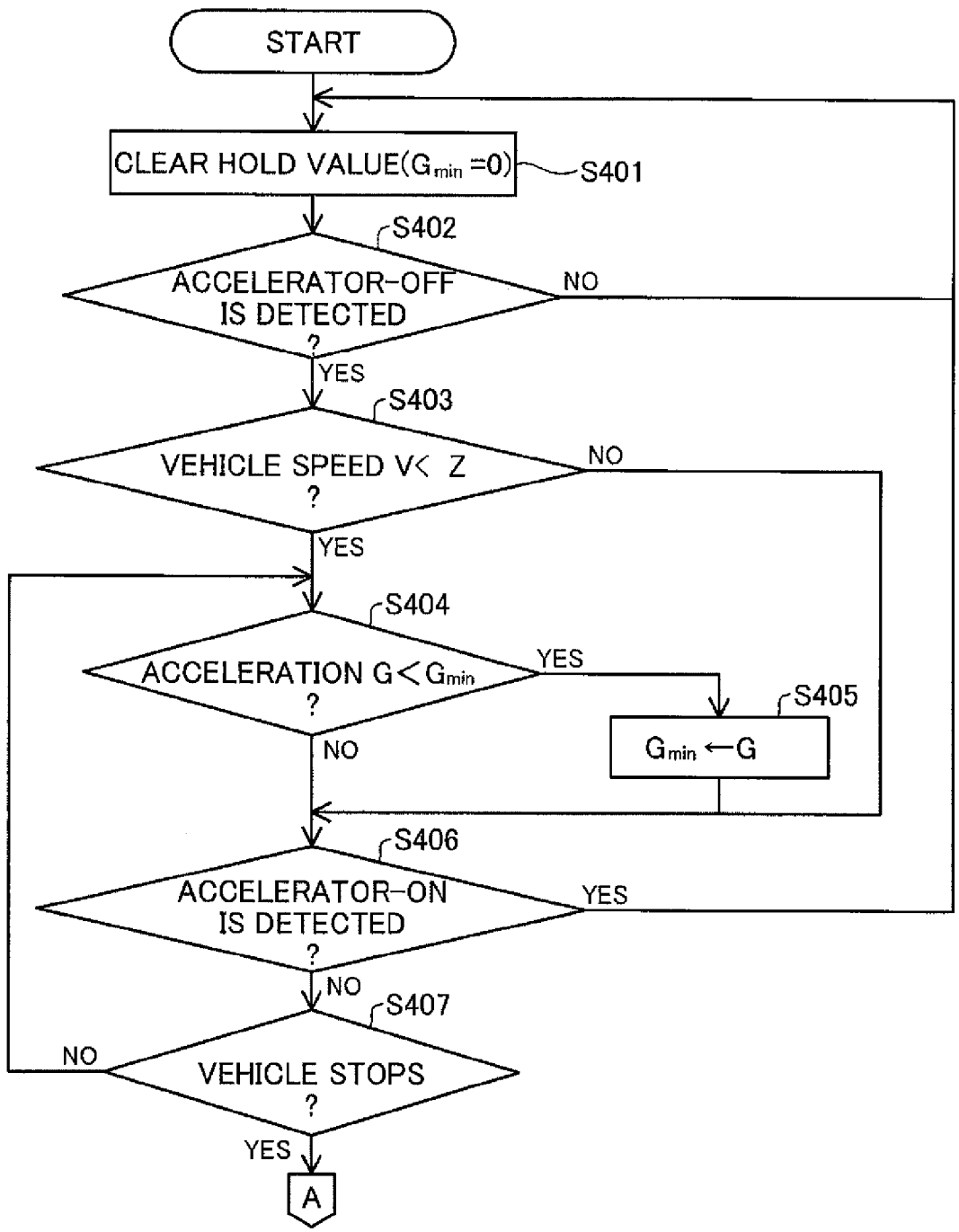
FIG. 13 is a flowchart illustrating a flow of idle reduction control according to the fourth embodiment.
Figure 14:
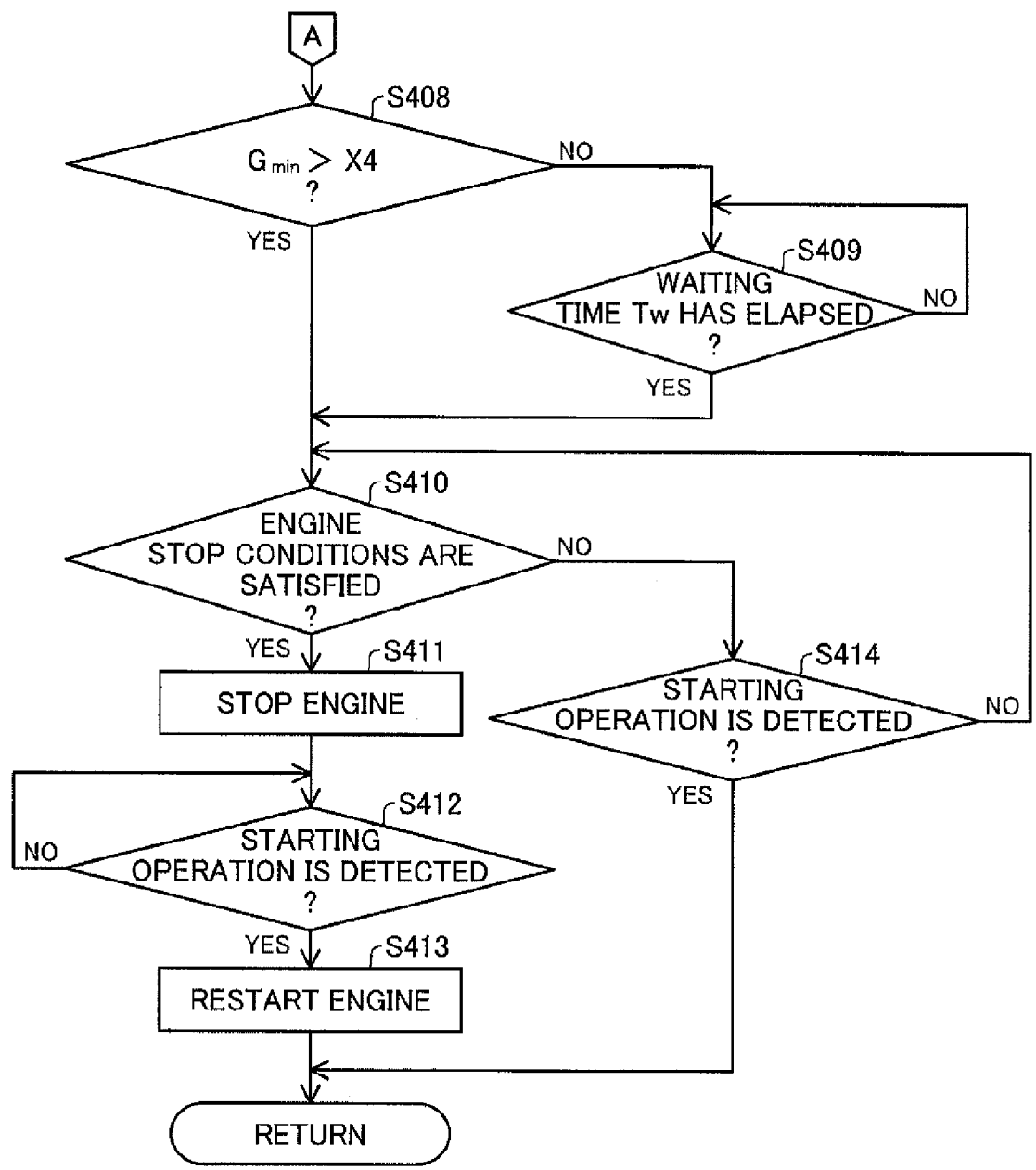
FIG. 14 is a flowchart illustrating the flow of idle reduction control according to the fourth embodiment.

FIGS. 13 and 14 are flowcharts illustrating a flow of idle reduction control according to the fourth embodiment. The following describes differences from the idle reduction control explained in the first embodiment. At step S401, the idle reduction ECU 510 clears the hold value of the minimum acceleration Gmin (Gmin=0) (step S401). The processing of step S402 is identical with the processing of step S102 of the first embodiment. At step S403, the idle reduction ECU 510 determines whether the vehicle speed V of the automobile 10 decreases below a threshold value Z (step S403). The threshold value Z is set arbitrarily.

When the vehicle speed V is lower than the threshold value Z (step S403: YES), it is expected that the automobile 10 is in the state immediately before a vehicle stop. The idle reduction ECU 510 then determines whether the acceleration G (<0) detected by the acceleration sensor 880 is less than the hold value of the minimum acceleration Gmin (step S404). When the detected acceleration G is less than the minimum acceleration Gmin (step S404: YES), the idle reduction ECU 510 updates the minimum acceleration Gmin (step S405). When the detected acceleration G is equal to or greater than the minimum acceleration Gmin (step S404: NO), on the other hand, the idle reduction ECU 510 skips the processing of step S405.

At step S403, when the vehicle speed V is equal to or higher than the threshold value Z (step S403: NO), on the other hand, it is expected that the automobile 10 is not in the state immediately before a vehicle stop. The idle reduction ECU 510 accordingly skips the processing of step S404. The processing of steps S406 and S407 is identical with the processing of steps S107 and S108 of the first embodiment. At step S408, the idle reduction ECU 510 determines whether the hold value of the minimum acceleration Gmin is greater than a threshold value X4 (step S408 in FIG. 14). The threshold value X4 (for example, X4=-0.5 m/s$^2$) is set arbitrarily and is stored in advance in the ROM of the idle reduction ECU 510.

When the minimum acceleration Gmin is equal to or less than the threshold value X4 (step S408: NO), a stop of the automobile 10 is predicted as a short-time vehicle stop. The idle reduction ECU 510 accordingly delays a stop of the engine 100 after the vehicle stop by the waiting time Tw (steps S409 to S411). When the maximum brake hydraulic pressure Pmax is greater than the threshold value X4 (step S408: YES), on the other hand, a stop of the automobile 10 is predicted as a long-time vehicle stop. The idle reduction ECU 510 accordingly stops the engine 100 substantially simultaneously with the stop of the automobile 10 without any delay time (steps S410 and 411). The processing of steps S412 to S414 is identical with the processing of steps S113 to S115 of the first embodiment. This is the flow of idle reduction control according to the fourth embodiment.

E. Modifications

The present invention is not limited to the embodiments or aspects described above but may be implemented by various other aspects within the scope of the invention. Some examples of possible modifications are given below.

E-1. Modification 1

According to the first embodiment, the idle reduction ECU 510 determines whether the automobile 10 stops at step S108 in idle reduction control (FIG. 3). Alternatively, the idle reduction ECU 510 may be configured to determine whether the speed of the automobile 10 is reduced to or below a predetermined speed (>0). In other words, the idle reduction ECU 510 may stop the engine 100 in the state where the automobile 10 does not stop. In this modification, at step S110, the idle reduction ECU 510 may define the waiting time Tw as a time elapsed since the speed of the automobile 10 goes down to the predetermined speed or may define as a time elapsed since a vehicle stop. The same applies to the idle reduction controls of the second to the fourth embodiments.

E-2. Modification 2

According to the first embodiment, when a stop of the automobile 10 is predicted as a long-time vehicle stop at step S109 in idle reduction control (FIG. 4), the idle reduction control stops the engine 100 substantially simultaneously with the stop of the automobile 10. One modification may provide a waiting time between a stop of the automobile 10 and a stop of the engine 100 even upon prediction of a long-time vehicle stop. This waiting time is preferably shorter than the waiting time Tw upon prediction of a short-time vehicle stop. This modification stops the engine earlier upon prediction of a long-time vehicle stop than that upon prediction of a short-time vehicle stop. This improves fuel consumption. The same applies to the idle reduction controls of the second to the fourth embodiments.

E-3. Modification 3

In the idle reduction control of the first embodiment, the method of detecting the change in brake hydraulic pressure P by the brake pedal force-reducing operation is not limited to the processing of steps S103 to S106 of the embodiment. For example, the idle reduction ECU 510 may obtain the brake hydraulic pressure P from the brake hydraulic pressure sensor 840 and define a difference between two temporally consecutive detection results as the brake hydraulic pressure difference $\Delta P$. Alternatively a change in brake hydraulic pressure P per unit time may be defined as the brake hydraulic pressure difference $\Delta P$.

E-4. Modification 4

The idle reduction control of the first embodiment returns the process flow to step S101 to clear the hold values, upon no detection of an accelerator-OFF at step S102 (FIG. 3) (step S102: NO) or upon detection of an accelerator-ON at step S107 (step S107: YES). A modification may return the process flow to step S102 and does not clear the hold values. This achieves a configuration of not clearing the hold values in the event of the driver's temporary accelerator pedal operation during the deceleration period Td.

E-5. Modification 5

According to the first embodiment, the idle reduction control determines whether the engine stop conditions are satisfied at step S111 (FIG. 4). A modification may omit the processing of step S111.

E-6. Modification 6

The above embodiments describe the configuration of using the brake hydraulic pressure P or the acceleration G as the parameter having a positive correlation to the amount of brake pedal operation. The automobile 10 may, however, be configured to detect any parameter other than the brake hydraulic pressure, which is related to the amount of brake pedal operation. For example, the automobile 10 may use an amount of brake pedal operation L detected by a brake stroke sensor or the magnitude or a change in brake pedal force F detected by a brake pedal force sensor, in place of the brake hydraulic pressure P.

E-7. Modification 7

According to the embodiments described above, the waiting time Tw is set as a fixed time. A modified configuration may change the waiting time Tw according to, for example, the maximum brake hydraulic pressure difference $\Delta Pmax$, the maximum brake hydraulic pressure Pmax or the minimum acceleration Gmin. For example, the idle reduction ECU 510 may be configured to provide a correspondence table of the waiting time Tw to the maximum brake hydraulic pressure difference $\Delta Pmax$. The idle reduction ECU 510 may calculate the maximum brake hydraulic pressure difference $\Delta Pmax$ and subsequently refer to the correspondence table to determine the waiting time Tw.

E-8. Modification 8

The embodiments illustrate the automobile 10 as an example of the vehicle. The vehicle is, however, not limited to the automobile but may be other than an automobile, for example, a train. The automobile 10 includes the automatic transmission 150 according to the above embodiments, but alternatively the automobile 10 may include a manual transmission.

E-9. Modification 9

Part of the functions implemented by the software according to the above embodiments may be implemented by hardware (for example, integrated circuit), or part of the functions implemented by hardware may be implemented by software.

REFERENCE SIGNS LIST

10,11 Automobile
100 Engine
150 Automatic transmission
200 Differential gear
250 Drive wheels
300 Starter
340 Drive mechanism
350 Alternator
400 Battery
450 Auxiliary machinery
500 Electronic control unit
510 Idle reduction ECU
520 Engine ECU
530 Transmission ECU
820 Wheel speed sensor
840 Brake hydraulic pressure sensor
860 Accelerator position sensor
880 Acceleration sensor

The invention claimed is:

1. An idle reduction control device mounted on a vehicle equipped with an engine and a brake, comprising:
   a detector that detects a parameter having a positive correlation to an amount of brake operation; and
   an engine controller that controls a start and a stop of the engine,
   wherein the engine controller stops the engine after a stop of the vehicle, when a reduction of the parameter caused by a release of the brake is equal to or greater than a predetermined value during a deceleration period before the stop of the vehicle, and
   wherein the engine controller prohibits the engine from being stopped after the stop of the vehicle and eliminates the prohibition after elapse of a predetermined time, when the reduction of the parameter is less than the predetermined value during the deceleration period.

2. The idle reduction control device according to claim 1, wherein
   the parameter is a brake hydraulic pressure, and
   the engine controller stops the engine after the stop of the vehicle, when a reduction of the brake hydraulic pressure caused by the release of the brake is equal to or greater than a predetermined value, during the deceleration period.

3. The idle reduction control device according to claim 2, wherein
   the engine controller stops the engine after the stop of the vehicle, when a difference between a brake hydraulic pressure detected by the detector and a maximum value of brake hydraulic pressures detected prior to the detected brake hydraulic pressure during the deceleration period is equal to or greater than a predetermined value.

4. An idle reduction control device mounted on a vehicle equipped with an engine and a brake, comprising:
   a detector that detects a brake hydraulic pressure having a positive correlation to an amount of brake operation; and
   an engine controller that controls a start and a stop of the engine,
   wherein the engine controller stops the engine after a stop of the vehicle, when a maximum value of the brake hydraulic pressure caused by the brake operation is equal to or less than a predetermined value during a deceleration period before the stop of the vehicle, and
   wherein the engine controller prohibits the engine from being stopped after the stop of the vehicle and eliminates the prohibition after elapse of a predetermined time when the maximum value of the brake hydraulic pressure is greater than the predetermined value during the deceleration period.

5. An idle reduction control device mounted on a vehicle equipped with an engine and a brake, comprising:
   a detector that detects a brake hydraulic pressure having a positive correlation to an amount of brake operation; and
   an engine controller that controls a start and a stop of the engine,
   wherein the engine controller stops the engine after a stop of the vehicle, when a maximum value of the brake hydraulic pressure caused by the brake operation is equal to or less than a predetermined value in a state where a vehicle speed of the vehicle decreases below a specified value during a deceleration period before the stop of the vehicle, and
   where the engine controller prohibits the engine from being stopped after the stop of the vehicle and eliminate the prohibition after elapse of a predetermined time, when the maximum value of the brake hydraulic pressure is greater than the predetermined value in the state where that the vehicle speed of the vehicle decreases below the specified value during the deceleration period.

6. A vehicle equipped with an engine and a brake, comprising:
   a detector that detects a parameter having a positive correlation to an amount of brake operation; and
   an engine controller that controls a start and a stop of the engine,
   wherein the engine controller stops the engine after a stop of the vehicle, when a reduction of the parameter caused by a release of the brake is equal to or greater than a predetermined value during a deceleration period before the stop of the vehicle, and
   wherein the engine controller prohibits the engine from being stopped after the stop of the vehicle and eliminates the prohibition after elapse of a predetermined time, when the reduction of the parameter is less than the predetermined value during the deceleration period.

7. A vehicle control method of controlling a vehicle equipped with an engine and a brake, comprising:
   (a) detecting a parameter having a positive correlation to an amount of brake operation; and
   (b) stopping the engine after a stop of the vehicle, when a reduction of the parameter caused by a release of the brake is equal to or greater than a predetermined value during a deceleration period before the stop of the vehicle, or
   prohibiting the engine from being stopped after the stop of the vehicle and eliminating the prohibition after elapse of a predetermined time, when the reduction of the parameter is less than the predetermined value during the deceleration period.

* * * * *